(12) United States Patent
Banerjee et al.

(10) Patent No.: US 11,593,175 B2
(45) Date of Patent: *Feb. 28, 2023

(54) NORMALIZING TARGET UTILIZATION RATES OF A CROSS-APPLICATION TABLE OF CONCURRENTLY EXECUTING APPLICATIONS TO SCHEDULE WORK ON A COMMAND QUEUE OF A GRAPHICS PROCESSORS

(71) Applicant: Apple Inc., Cupertino, CA (US)

(72) Inventors: Kutty Banerjee, San Jose, CA (US); Michael Imbrogno, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,624

(22) Filed: May 2, 2022

(65) Prior Publication Data
US 2022/0261290 A1 Aug. 18, 2022

Related U.S. Application Data

(63) Continuation of application No. 16/795,814, filed on Feb. 20, 2020, now Pat. No. 11,321,134.

(60) Provisional application No. 62/855,591, filed on May 31, 2019.

(51) Int. Cl.
*G06F 9/50* (2006.01)
*G06T 1/20* (2006.01)
*G06F 9/48* (2006.01)

(52) U.S. Cl.
CPC .......... *G06F 9/5038* (2013.01); *G06F 9/4881* (2013.01); *G06T 1/20* (2013.01)

(58) Field of Classification Search
CPC ...... G06F 9/5038; G06F 9/4881; G06F 9/505; G06F 2209/5022; G06T 1/20
See application file for complete search history.

(56) References Cited

U.S. PATENT DOCUMENTS

| | | | |
|---|---|---|---|
| 7,792,597 B2 * | 9/2010 | Brey | ...................... G06F 1/3296 713/322 |
| 9,626,295 B2 | 4/2017 | Park | |
| 2008/0114566 A1 | 5/2008 | Solecky | |
| 2011/0212761 A1 * | 9/2011 | Paulsen | ............... G07F 17/3202 345/522 |

(Continued)

*Primary Examiner* — Jorge A Chu Joy-Davila
(74) *Attorney, Agent, or Firm* — Blank Rome LLP

(57) ABSTRACT

In general, embodiments are disclosed herein for tracking and allocating graphics hardware resources. In one embodiment, a software and/or firmware process constructs a cross-application command queue utilization table based on one or more specified command queue quality of service (QoS) settings, in order to track the target and current utilization rates of each command queue on the graphics hardware over a given frame and to load work onto the graphics hardware in accordance with the utilization table. Based on the constructed utilization table for a given frame, any command queues that have exceed their respective target utilization value may be moved to an "inactive" status for the duration of the current frame. For any command queues that remain in an "active" status for the current frame, work from those command queues may be loaded on to slots of the appropriate data masters of the graphics hardware in any desired order.

20 Claims, 8 Drawing Sheets

(56) References Cited

U.S. PATENT DOCUMENTS

| | | |
|---|---|---|
| 2012/0198322 A1 | 8/2012 | Gulwani |
| 2015/0188797 A1* | 7/2015 | Satat .................. G06F 15/7825 709/224 |
| 2017/0256018 A1 | 9/2017 | Gandhi |
| 2017/0295260 A1 | 10/2017 | Pierce |

* cited by examiner

400

| APPLICATION 0 RUNNING ON DEVICE A | | |
|---|---|---|
| COMMAND QUEUES | TARGET UTILIZATION | NORMALIZED TARGET UTIL. |
| CQ0 | 50% | 25% |
| CQ1 | 30% | 15% |
| CQ2 | 20% | 10% |

| APPLICATION 1 RUNNING ON DEVICE A | | |
|---|---|---|
| COMMAND QUEUES | TARGET UTILIZATION | NORMALIZED TARGET UTIL. |
| CQ3 | 20% | 10% |
| CQ4 | 80% | 40% |

405

410

UTILIZATION TABLE FOR DEVICE A

| COMMAND QUEUES | NORMALIZED TARGET UTIL. | CURRENT UTILIZATION | |
|---|---|---|---|
| CQ0 | 25% | 15% | ACTIVE |
| CQ1 | 15% | 10% | |
| CQ2 | 10% | 9% | |
| CQ3 | 10% | 9% | |
| CQ4 | 40% | 27% | |
| CQ | 10% | 10% | INACTIVE |
|  |  |  | |
|  |  |  | |

NORMALIZING TARGET UTILIZATION RATES OF A CROSS-APPLICATION TABLE OF CONCURRENTLY EXECUTING APPLICATIONS TO SCHEDULE WORK ON A COMMAND QUEUE OF A GRAPHICS PROCESSORS

BACKGROUND

This disclosure relates generally to the field of graphics processing. More particularly, but not by way of limitation, this disclosure relates to utilizing both firmware and hardware to track and balance the execution of work on a graphics processor, such as a graphics processing unit (GPU).

One goal for managing graphics hardware resources for computing devices, such as GPUs, is to utilize as much of the GPU (for as much of the time) as is possible, without suffering undesirable performance issues. One approach in increasing a computing device's hardware utilization is to simultaneously execute multiple processes in parallel and dynamically allocate the graphics hardware resources between them. In many cases, the underlying graphics hardware resources may not be allocated at a fine enough granularity to match a requested division of resources, thus causing the "starvation" of one or more processes (e.g., causing one or more lower priority processes to not have access to the graphics hardware). In addition, software systems issuing or generating such requests are often unable to detect when the underlying graphics hardware resources have been allocated differently from the requests. Further, the various queues of commands submitted to the graphics hardware by one or more executing application processes may not receive "fair," i.e., equitable, treatment (e.g., in terms of their commands being submitted to the graphics hardware for execution)—both across different application processes, as well as across the various queues of command buffers submitted by an individual application process. Each of these situations can result in the graphics hardware utilization being sub-optimal.

SUMMARY

The following summary is included in order to provide a basic understanding of some aspects and features of the claimed subject matter. This summary is not an extensive overview and as such it is not intended to particularly identify key or critical elements of the claimed subject matter or to delineate the scope of the claimed subject matter. The sole purpose of this summary is to present some concepts of the claimed subject matter in a simplified form as a prelude to the more detailed description that is presented below.

In one embodiment, a method for utilizing graphics hardware resources is described. The example method obtains one or more command queues (i.e., ordered lists of one or more command buffers) for each of one or more executing applications. Then, for each command queue across the one or more executing applications, the method obtains a desired quality of service (QoS) setting. According to some embodiments, the QoS setting may comprise a desired percentage of hardware resource utilization for the particular command queue.

Next, the method may perform a normalization operation on the command queue QoS settings received across the one or more executing applications to obtain normalized target utilization values for each command queue. In some embodiments, each executing application may be treated equitably with the other executing applications (e.g., in an instance where there are two executing applications, even if one application has submitted one command queue for execution and the other application has submitted one hundred command queues for execution, the graphics hardware's processing resources may be split evenly across the two executing applications). In other embodiments, particular inequitable splits of the graphics hardware may be specified by an entity having sufficient authority within the computing system.

Once the normalized target utilization values have been obtained for each command queue, the method may perform a utilization analysis, e.g., by constructing a utilization table in memory, wherein the normalized target utilization value and the current utilization value (i.e., the accumulated usage for the current frame being generated for display) for each command queue are stored. Based on the constructed utilization table for a given frame, any command queues that have exceed their respective normalized target utilization value (i.e., in terms of utilization of graphics hardware resources) may be moved to an "inactive" status for the duration of the current frame. For any command queues that remain in an "active" status for the current frame, work from those command queues may be loaded on to "slots" of the appropriate "data masters" of the graphics hardware according to the normalized target utilization values and the current utilization values. [As used herein, "slots" refers to a portion of a given cluster's graphics hardware resources. As used herein, "data master" refers to a portion of a given piece of graphics hardware that deals with a particular type of workload, e.g., a given graphics hardware processor may have three separate data masters, i.e., one each for: vertex commands, fragment (also known as "3D") commands, and compute commands. Note that each data master may be submitted to one or more channels (e.g., depending on the underlying graphics hardware implementation), and that each of the data masters on a given graphics hardware may share across multiple resources, such as various shader cores and memories.]

In some embodiments, work from the active command queues may be loaded onto the slots of a given data master in any order (i.e., giving no preference to which executing application a given command queue was submitted from). In other embodiments, work from a command queue that is intended for a given data master may be prioritized (or de-prioritized), e.g., based on which executing application submitted the command queue. In still other embodiments, work that has been moved to an 'inactive' status for the duration of the frame may be submitted for execution if all the active command queues have been submitted for execution (and/or reached their normalized target utilizations) and there are still processing cycles remaining in the current frame.

In one embodiment, the above described methods, and variations thereof, may be implemented as a series of computer executable instructions. Such instructions may use any of one or more convenient programming languages. Such instructions may be collected into engines and/or programs and stored in any media that is readable and executable by a computer system or other programmable control device.

BRIEF DESCRIPTION OF THE DRAWINGS

While certain embodiments will be described in connection with the illustrative embodiments shown herein, this disclosure is not limited to those embodiments. On the contrary, all alternatives, modifications, and equivalents are included within the spirit and scope of this disclosure as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION

Figure 1:
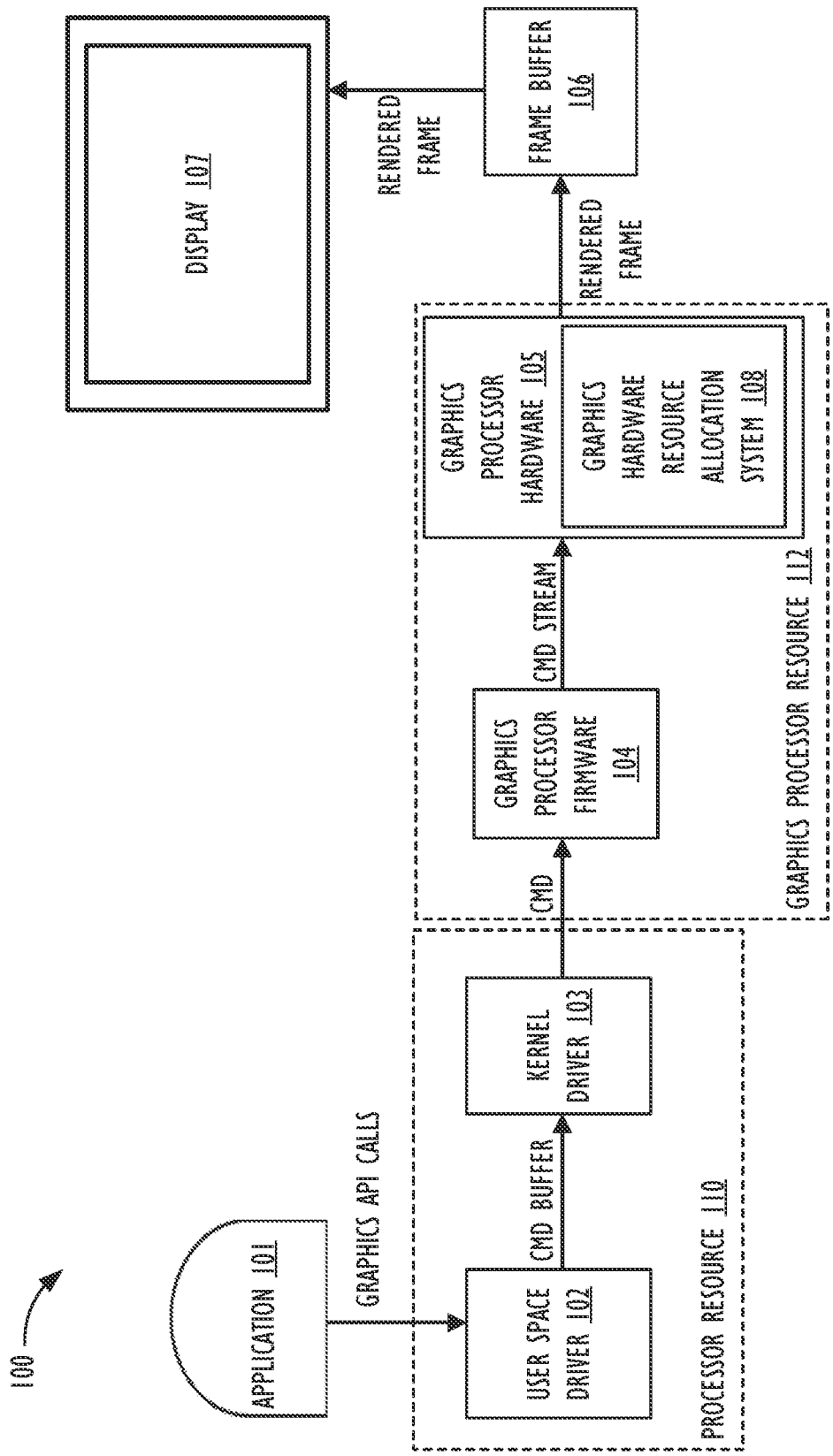
FIG. 1 is a diagram of a graphics processing path where embodiments of the present disclosure may operate.

This disclosure includes various example embodiments that allow for the controlled utilization of graphics hardware resources—both among the various command queues submitted by a single application and across executing applications. In one embodiment, a software and/or firmware process constructs a cross-application command queue utilization table for a given graphics hardware device, e.g., based on one or more specified command queue QoS settings, in order to track the target and current utilization rates of each command queue on the graphics hardware over a given frame and load work onto the graphics hardware in accordance with the utilization table.

In such embodiments, the graphics hardware may also comprise a resource allocation system that includes clusters that process the so-called "kicks" (i.e., discrete units of instructions) that are submitted to a graphics processor. Each cluster may maintain its own hardware mechanism (e.g., stall counters) to track when a designated data master is unable to schedule more work (e.g., part of a kick) for a given frame, e.g., because other data masters are utilizing all of the available graphics hardware resources and to report back current hardware utilization rates to the utilization table, so that the software and/or firmware process may adjust the sources and/or types of work being loaded on to the graphics hardware over future processing cycles, if necessary, to ensure that the target utilization rates are not exceeded.

As used herein, the term "kernel" in this disclosure refers to a computer program that is part of a core layer of an operating system (e.g., Mac OSX™) typically associated with relatively higher or the highest security level. The "kernel" is able to perform certain tasks, such as managing hardware interaction (e.g., the use of hardware drivers) and handling interrupts for the operating system. To prevent application programs or other processes within a user space from interfering with the "kernel," the code for the "kernel" is typically loaded into a separate and protected area of memory. Within this context, the term "kernel" may be interchangeable throughout this disclosure with the term "operating system kernel."

The disclosure also uses the term "compute kernel," which has a different meaning and should not be confused with the term "kernel" or "operating system kernel." In particular, the term "compute kernel" refers to a program for a graphics processor (e.g., GPU, DSP, or FPGA). In the context of graphics processing operations, programs for a graphics processor are classified as a "compute kernel" or a "shader." The term "compute kernel" refers to a program for a graphics processor that performs general compute operations (e.g., compute commands), and the term "shader" refers to a program for a graphics processor that performs graphics operations (e.g., render commands).

As used herein, the term "application program interface (API) call" in this disclosure refers to an operation an application is able to employ using a graphics application program interface (API). Examples of API calls include draw calls for graphics operations and dispatch calls for computing operations. Examples of graphics API include OpenGL®, Direct3D®, or Metal® (OPENGL is a registered trademark of Silicon Graphics, Inc.; DIRECT3D is a registered trademark of Microsoft Corporation; and METAL is a registered trademark of Apple Inc.). Generally, a graphics driver translates API calls into commands a graphics processor is able to execute.

For the purposes of this disclosure, the term "processor" refers to a programmable hardware device that is able to process data from one or more data sources, such as memory. One type of "processor" is a general-purpose processor (e.g., a CPU or microcontroller) that is not customized to perform specific operations (e.g., processes, calculations, functions, or tasks), and instead is built to perform general compute operations. Other types of "processors" are specialized processor customized to perform specific operations (e.g., processes, calculations, functions, or tasks). Non-limiting examples of specialized processors include GPUs, floating-point processing units (FPUs), DSPs, FPGAs, application-specific integrated circuits (ASICs), and embedded processors (e.g., universal serial bus (USB) controllers).

As used herein, the term "graphics processor" refers to a specialized processor for performing graphics processing operations. Examples of "graphics processors" include, but are not limited to, a GPU, DSPs, FPGAs, and/or a CPU emulating a GPU. In one or more implementations, graphics processors are also able to perform non-specialized operations that a general-purpose processor is able to perform. Examples of general compute operations are compute commands associated with compute kernels.

As used herein, the term "command queue" refers to ordered lists of one or more command buffers for submission to a graphics hardware. A single command buffer may contain work of various types, e.g., blit commands, vertex commands, fragment commands, compute commands, etc., which may each then be mapped on the various data masters of the graphics hardware. For this reason, command buffers may be produced using encoders of various types, and a given command queue may contain a mix of all possible work types, if so desired by a developer.

FIG. 1 is a diagram of a graphics processing path 100 where embodiments of the present disclosure may operate. FIG. 1 illustrates an example in which the graphics processing path 100 utilizes a processor resource 110 and a graphics processor resource 112. The processor resource 110 includes one or more general-purpose processors (e.g., CPUs), where each processor has one or more cores. The processor resource 110 can also contain and/or communicate with memory, other microcontrollers, and/or any other graphics hardware resources a processor may utilize to process commands for graphics processor resource 112 to execute. The graphics processor resource 112 includes one or more graphics processors (e.g., GPUs), where each graphics processor has one or more execution cores and other computing logic for performing graphics and/or general compute operations. Stated another way, the graphics processor resource 112 may also encompass and/or communicate with memory (e.g., memory cache), and/or other graphics hardware resources to execute programs, such as shaders or compute kernels.

FIG. 1 illustrates that application 101 generates graphics API calls for the purpose of encoding commands for the graphics processor resource 112 to execute. To generate the graphics API calls, application 101 includes code written with a graphics API. The graphics API (e.g., Metal®) represents a published and/or standardized graphics library and framework that define functions and/or other operations that application 101 is able to have with a graphics processor. For example, the graphics API allows application 101 to be able to control the organization, processing, and submission of render and compute commands, as well as the management of associated data and resources for those commands.

In one or more implementations, application 101 is a graphics application that invokes the graphics API to convey a description of a graphics scene. Specifically, the user space driver 102 receives graphics API calls from application 101 and maps the graphics API calls to operations understood and executable by the graphics processor resource 112. For example, the user space driver 102 can translate the API calls into commands encoded within command buffers before being transferred to kernel driver 103. The translation operation may involve the user space driver 102 compiling shaders and/or compute kernels into commands executable by the graphics processor resource 112. The command buffers are then sent to the kernel driver 103 to prepare the commands for execution on the graphics processor resource 112. As an example, the kernel driver 103 may perform memory allocation and scheduling of the commands to be sent to the graphics processor resource 112. For the purpose of this disclosure and to facilitate ease of description and explanation, unless otherwise specified, the user space driver 102 and the kernel driver 103 are collectively referred to as a graphics driver.

FIG. 1 illustrates that the graphics processor firmware 104 obtains commands from processor resource 110. The graphics processor firmware 104 can perform a variety of operations to manage the graphics processor hardware 105 that includes powering on and off the graphics processor hardware 105 and/or scheduling the order of commands (and/or deciding which commands) the graphics processor hardware 105 receives for execution. With reference to FIG. 1 as an example, the graphics processor firmware 104 can be implemented by a graphics microcontroller that boots up firmware. Specifically, the graphics microcontroller could be embedded in the same package as a graphics processor within the graphic processor resource 112 and setup to pre-process commands for the graphics processor. In other implementations, the graphics microcontroller is physically separated from the graphics processor.

After scheduling the commands, in FIG. 1, the graphics processor firmware 104 sends command streams (e.g., multiple kicks) to the graphics processor hardware 105. The graphics processor hardware 105 then executes the kicks within the command streams according to the order the graphics processor hardware 105 receives the kicks. The graphics processor hardware 105 includes graphics hardware resources that are able to execute a number of received kicks in parallel. The graphics processor hardware 105 then outputs rendered frames to frame buffer 106. In one implementation, the frame buffer 106 is a portion of memory, such as a memory buffer, that contains a bitmap that drives display 107. Display 107 subsequently accesses the frame buffer 106 and converts (e.g., using a display controller) the rendered frame (e.g., bitmap) to a video signal for display.

In one or more embodiments, the graphics processor firmware 104 may include normalization and/or utilization logic, in order to ensure that a developer's desired QoS settings for individual command queues are respected within a given application—and that multiple applications running on the device are treated equitably with one another (if the operating system so desires equitable treatment per application). Further details regarding the implementation of the graphics processor firmware 104 normalization and utilization logic and how it is implemented to load work onto the graphics hardware will be described in further detail below, e.g., with reference to FIGS. 3, 4A, 4B, and 6.

In one or more embodiments, the graphics processor hardware 105 may also include a graphics hardware resource allocation system 108 that allocates graphics hardware resources (not shown in FIG. 1) to execute kicks processor resource 110 submits to the graphics processor resource 112. The graphics hardware resource allocation system 108 receives the kicks and breaks the kicks down into work that the graphics hardware resources (e.g., vertex shaders, fragment shaders, united shader clusters, registers, or computational units) are able to execute. As used herein, the term "kick" in this disclosure refers to a discrete unit of instructions that are submitted to a graphics processor. For example, the user kernel driver 103 splits commands committed for a graphics processor to execute into a finer granularity of instructions for the graphics processor to execute. The finer granularity of instructions represent kicks, where each kick can target a specialized type of data master (e.g., a pixel data master, fragment data master, or compute data master). For the purpose of this disclosure, the term "work" represents a finer unit of instructions than a "kick." Stated another way, the graphics hardware resource allocation system 108 receives "kicks" and breaks the "kicks" down into a smaller granularity of instructions referenced as "work."

The graphics hardware resource allocation system 108 tracks and prevents starvation and/or reduces delays in utilizing the graphics hardware resources. In one embodiment, the graphics hardware resource allocation system 108 includes hardware stall counters that track when one or more designated data masters are unable to schedule work. In some situations, non-designated data masters may prevent designated data masters from utilizing available graphics hardware resources. The hardware stall counters are setup to increment at specified time periods. For example, the hardware stall counters could increment every graphics processor clock cycle when the designated data master has available work to execute but the graphics hardware resources are unable to actually execute the work. Based on the counter information from the hardware stall counters, the graphics hardware resource allocation system 108 may generate a hardware driven pause notification to pause non-designated data masters from submitting work and/or pause the processing of submitted work from the non-designated data master. By implementing the hardware pause, the clusters are then able to execute work from the designated data masters. The hardware driven pause may pause work from non-designated data master until graphics hardware resource allocation system 108 selects a new designated data master to track with the hardware stall counters.

Figure 2:
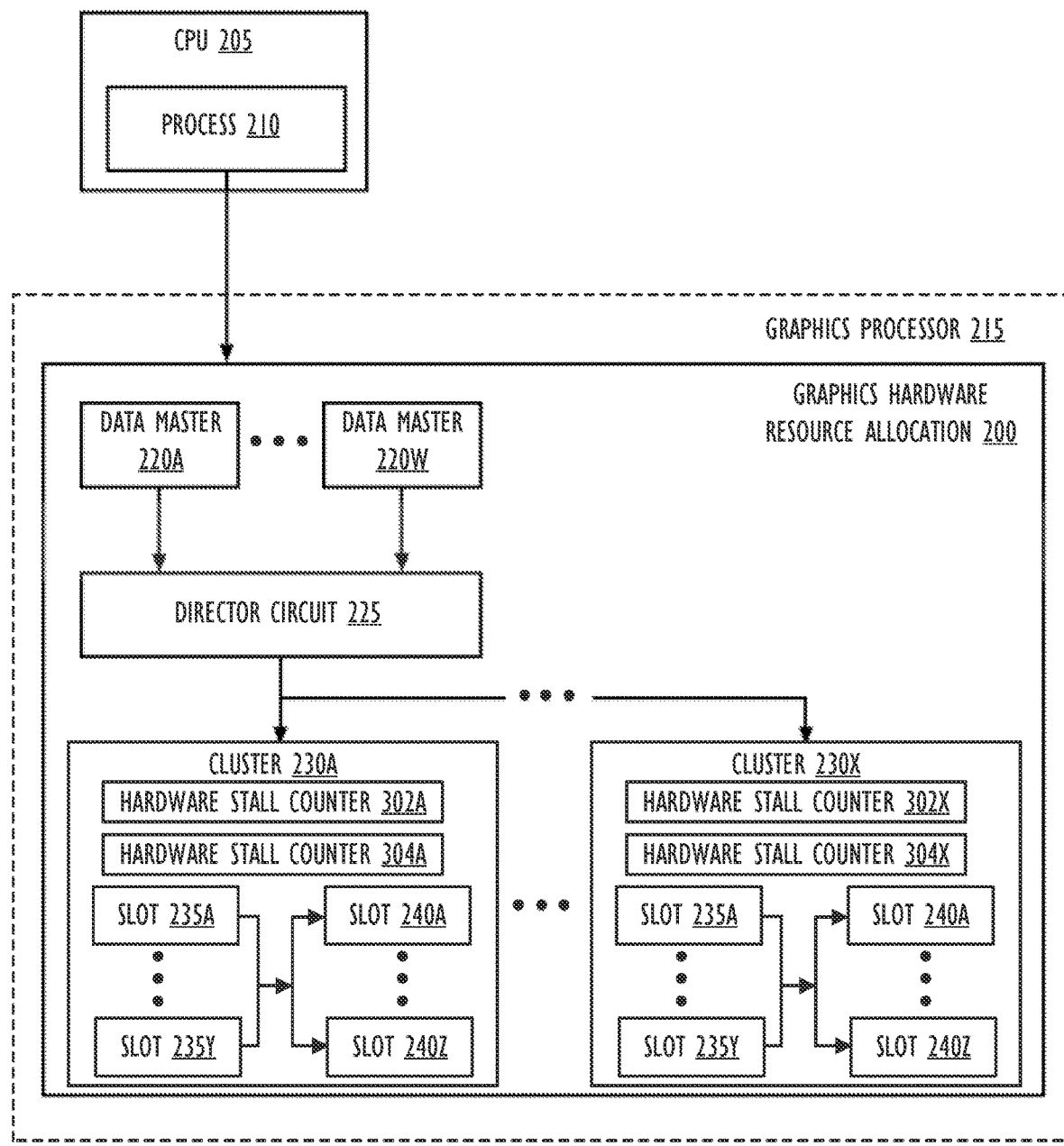
FIG. 2 is a block diagram of an embodiment of a graphics hardware resource allocation system, which corresponds to the graphics hardware resource allocation system shown in FIG. 1.

FIG. 2 is a block diagram of an embodiment of a graphics hardware resource allocation system 200, which corresponds to the graphics hardware resource allocation system 108 shown in FIG. 1. As shown in FIG. 2, the graphics hardware resource allocation system 200 is part of the graphics processor 215 that communicates with a CPU 205 (on which process 210 executes). The graphics hardware resource allocation system 200 includes data maters 220A-W, director circuit 225 and clusters 230A-X. Each cluster further includes graphics hardware resources organized into "slots" 235A-Y and hardware resource utilization sensors 240A-Z. Examples of graphics hardware resources include universal shaders, vertex shaders, fragment shaders, computational units, registers, and the like. Each of slots 235A-Y represent a portion of a cluster's graphics hardware resources. At run-time, process 210 may issue a series of commands to be executed by graphics processor 215. The commands are broken into kicks that are then sent to data masters 220A-W. With reference to FIG. 1, application 101 may generate process 210 and/or other processes (not shown in FIG. 2) that provide kicks to graphics processor 215.

Each data master 220A-W represents a graphics hardware interface for submitting work to a graphics processor 215. Within this disclosure, the term "graphics hardware interface" may be used interchangeably with the term "data master." Data masters 220A-W may include multiple types of data masters 220 within the graphics hardware resource allocation system 200. There could also be multiple instances of the same type of data master 220 associated with a graphics processor 215. In tile based deferred rendering (TBDR) GPU architectures, for example, where graphics rendering may be divided into geometry and pixel phases, there may be one or more vertex data masters 220, one or more pixel data masters 220 and one or more compute data masters 220. In immediate mode rendering GPU architectures, where graphics rendering may be grouped by draw commands, different data masters 220 may be used for different objects (wherein each object is responsible for processing its own vertex and pixel data). As such, data masters 220 may be considered heterogeneous in the sense each type of data master 220 can have different characteristics for acquiring resources and being dispatched to a graphics processor 215.

Each data master 220A-W may break kicks received from process 210 into finer granularity work and submit the work to one or more director circuits 225. One or more data masters 220A-W could receive kicks from other processes not shown in FIG. 2. Recall that a kick represents instructions at a certain granularity level that can be submitted to graphics processor 215 for processing. Director circuit 225 ensures that each kick is allocated a specified amount of cluster resources (e.g., in units of slots 235A-Y) in accordance with priority. As shown in FIG. 2, each of the clusters 230A-Y have hardware resource utilization sensors 240A-Z used to track the utilization of a single (unique) kick on its corresponding cluster 230. That is, if a cluster 230 (e.g., cluster 230A) could execute a single kick at a time, one hardware resource utilization sensor 240 (e.g., hardware resource utilization sensor 240A) may be used for that cluster 230 (e.g., cluster 230A). If a cluster 230 (e.g., cluster 230B) could execute 'J' unique kicks at a time, 'J' hardware resource utilization sensors 240 (e.g., sensors 240A-J) would be needed for the cluster (e.g., 230B). In another example, there may be as many different kicks executing on a cluster 230 as the cluster has slots 235.

FIG. 2 also illustrates that the graphics hardware resource allocation system 200 includes multiple hardware stall counters, e.g., 302A-X and 304A-X. Each cluster 230A-X within the graphics processor 215 includes corresponding hardware stall counters 302A-X and 304A-X. Using FIG. 2 as an example, cluster 230A contains hardware stall counters 302A and 304A, and cluster 230X includes hardware stall counters 302X and 304X. The graphics processor 215 can generate and supply one or more graphics processor clock signals for the hardware stall counters 302A-X and 304A-X. Each hardware stall counter 302A-X and 304A-X may increment based on the received graphics processor clock signal and when the corresponding cluster 230A-X satisfies a delay increment condition. As an example, a given hardware stall counter 302A can encounter a delay increment condition when a designated data master 220 (e.g., data master 220A) has work to submit, but was unable to utilize an allocated set of slots 235 within cluster 230A for a given time period (e.g., one or more graphics processor clock cycles). As a result, the hardware stall counter 302A increments by one. The hardware stall counter 302A continues to increment when the delay increment condition occurs in subsequent time periods (e.g., one or more subsequent graphics processor clock cycles).

In FIG. 2, the director circuit 225 is able to designate multiple data masters 220 for tracking, where each hardware stall counter 302 and 304 is setup to track one of the designated data masters 220. For example, the director circuit 225 may designate data master 220A and 220W for tracking, such that hardware stall counter 302 tracks data master 220A, and hardware stall counter 304 tracks data master 220W. Although FIG. 2 illustrates that each cluster 230 includes two hardware stall counters 302 and 304, other embodiments could have each cluster 230 including more than two hardware stall counters 302. Because the hardware stall counters are distributed amongst clusters 230A-X, when one of the cluster 230A-X fails to launch work for the designated data master 220, the respective hardware stall counters 302/304 may increment without affecting other hardware stall counters. As an example, if cluster 230A does not process work for a designated data master 220 (e.g., data master 220A) within a specified time period (e.g., one or more graphics processor clock cycles), then the corresponding hardware stall counter 302A increments by one. Having cluster 230A satisfy the delay increment condition does not affect the counts on the other hardware stall counters 302B-302X. Instead, the other hardware stall counters 302B-302X will increment when their respective clusters 230B-230X separately satisfy the delay increment condition.

After designating data master 220 for tracking with the hardware stall counters 302/304, the director circuit 225 can receive and aggregate the count values from the hardware stall counters 302A-X and 304A-X. By aggregating the count values, the director circuit 225 determines whether to generate a hardware driven pause notification. For example, director circuit 225 can obtain count values from the hardware stall counters 302A-X and 304A-X, and subsequently compute an average or weighted average from the count values. The average or weight average may be designated as an overall count value, such that the director circuit 225 compares the overall count value to one or more thresholds. Based on the comparison, the director circuit 225 determines whether to generate a hardware driven pause notification. In another example, the director circuit 225 may determine a maximum count value received from the hardware stall counters 302A-X and 304A-X and set the maximum count value as the overall count value. Other embodiments of the director circuit 225 could use other statistical operations (e.g., median) to determine an overall count value for generating hardware driven pause notifications.

In other embodiments, the director circuit 225 could generate multiple overall count values. Each overall count value could, e.g., correspond to one of the designated data masters 220. As an example, the director circuit 225 could generate one overall count value for hardware stall counter 302, which tracks data master 220A and another overall count value for hardware stall counters 304, which tracks data master 220W. The overall count values could then be compared to one or more threshold values to determine whether the director circuit 225 generates one or more hardware driven pause notifications.

The threshold values for evaluating the overall count values may differ and depend on which designated data master 220 the overall count value corresponds to. For example, the director circuit could designate data master 220A as the first priority data master and data master 220W as the second priority data master. In other words, designated data master 220A has a higher priority to access slots 235 within clusters 230 over designated data master 220W. Because of the difference in priority, the threshold value associated with designated data master 220A could be less than the threshold value associated with designated data master 220B. In another example, a single threshold value may be setup for evaluating both overall count values regardless of whether the designated data masters 220 have the same or different priority level.

In one embodiment, the hardware driven pause notification can provide instructions to pause all non-designated data masters 220, and thereby, allow the clusters 230 to execute the designated data masters 220. In another embodiment, the hardware driven pause notification can cause one of the non-designated data masters 220 to pause. For example, the hardware driven pause notification could provide instructions to pause the non-designated data master 220 with the lowest priority of the non-designated data masters 220. Other embodiments of the director circuit 225 could generate the hardware driven pause notification to pause some, but not all, of the non-designated data masters.

The director circuit 225 can communicate hardware driven pause notifications to one or more data masters 220 and/or to the clusters 230. In situations where the director circuit 225 provides a hardware driven pause notification to a non-designated data master 220 (e.g., data master 220A), the non-designated data master 220 stops submitting work to clusters 230 in response to receiving the hardware driven pause notification. Preventing a data master 220 from submitting work to clusters 230 allows clusters 230 to execute work from the designated data master 220. Alternatively or additionally, director circuit 225 is able to provide the hardware driven pause notifications to one or more clusters 230. When clusters 230 receive the hardware driven pause notification from the director circuit, clusters 230 pause the execution of work submitted from non-designated data masters 220. By doing so, clusters 230 are also able to execute work for the designated data masters 220.

The hardware driven pause may pause the non-designated data masters 220 until the director circuit 225 identifies a new designated data master 220 and/or the designated data master 220 completes its outstanding work. For example, after pausing the non-designated data masters 220, clusters 230 execute work for the designated data master 220. As clusters 230 execute work for the designated data master 220, the director circuit 225 may continue to track graphics hardware resource utilization information for the graphics processor 215. Based on the graphics hardware resource utilization information, the director circuit 225 and/or clusters 230 may determine to un-pause and resume the execution of work associated with the non-designated data masters 220. The director circuit 225 and/or clusters 230 may resume execution of work for the non-designated data masters 220 when the director circuit 225 assigns a new designated data master 220 to track with the hardware stall counters 302/304. In another example, the non-designated data masters 220 may un-pause when the designated data master 220 completes its outstanding work. Utilizing graphics hardware resource utilization information is discussed in more detail with reference to FIG. 5.

As may now be more fully understood, the utilization of hardware stall counters 302 and 304 within graphics hardware resource allocation system 200 allows for hardware monitoring and controlling, in real-time, of a process's QoS. As used herein, real-time means during graphics processor operations involving the process whose QoS is being measured and controlled. The concept of QoS as it applies to the graphics hardware resource allocation system 200 may involve dynamically generating an "output QoS" based on an "input QoS." An input QoS refers to an input priority a process and/or application assigns to commands. Based on the input QoS, the graphics hardware resource allocation system 200 initially allocates a certain amount of graphics hardware resources to execute work, which initially represents a target utilization of graphics hardware resources. The graphics hardware resource allocation system 200 generate an output QoS to ensure that work (e.g., a kick) sent to a graphics processor 215 actually receives the allocated amount of resources during its execution, which represents a current utilization of graphics hardware resource. A process's ability to utilize its allocated graphics hardware resources (e.g., slots 235A-Y), in turn, may be described in terms of its current utilization of those allocated resources, e.g., on a kick-by-kick basis. Additionally or alternatively, output QoS may also refer to a related group or collection of work (e.g., as generated by process 210 executing on CPU 205). In other embodiments, output QoS refers to the current resource utilization of a group or collection of processes (e.g., process 210 and other processes executing on CPU 205).

Figure 3:
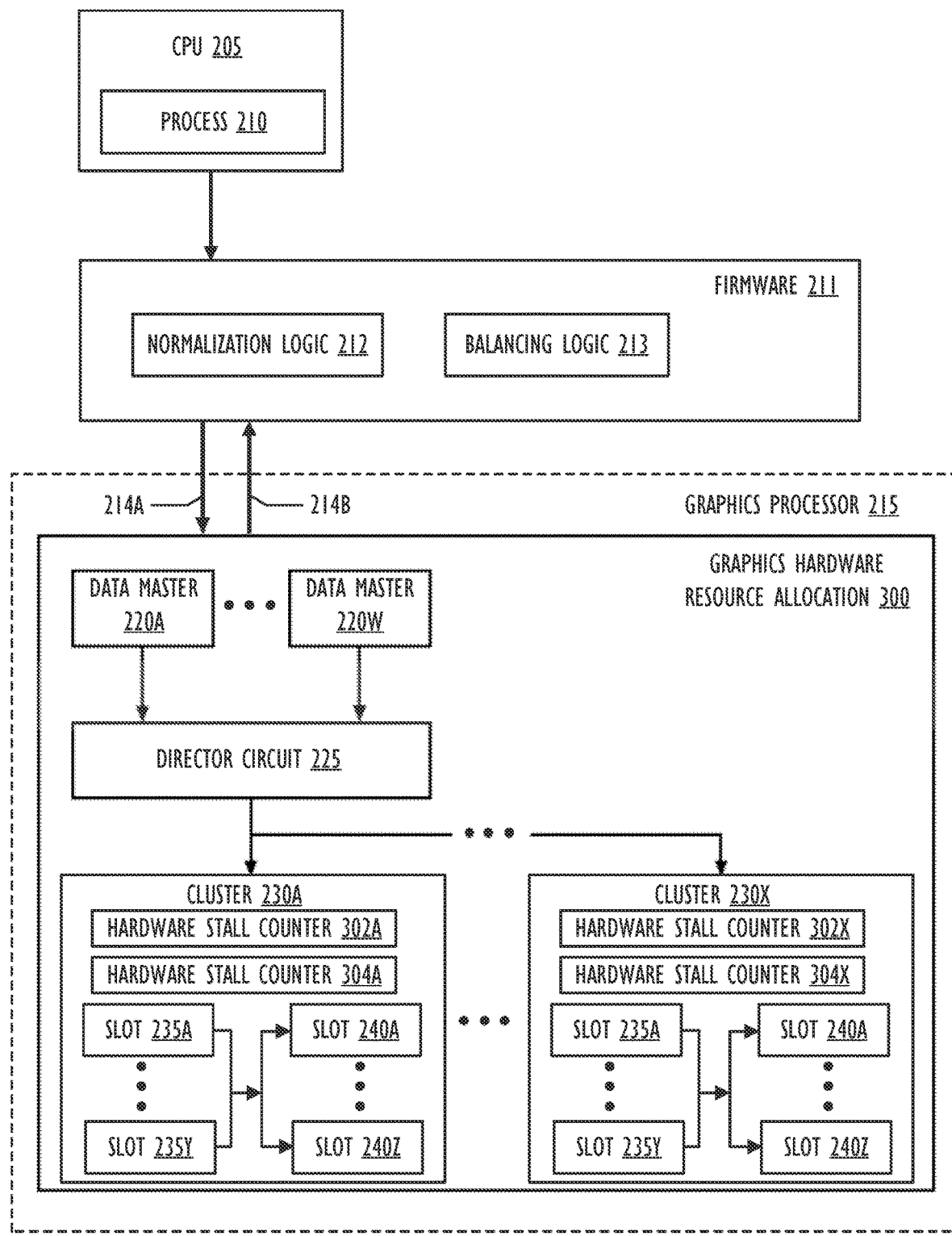
FIG. 3 is a block diagram of another embodiment of a graphics hardware resource allocation system, which also corresponds to the graphics hardware resource allocation system shown in FIG. 1.

FIG. 3 is a is a block diagram of another embodiment of a graphics hardware resource allocation system, which also corresponds to the graphics hardware resource allocation system shown in FIG. 1. Graphics hardware resource allocation system 300 is similar to graphics hardware resource allocation system 200 shown in FIG. 2, except that graphics hardware resource allocation system 300 further comprises firmware 211. Firmware 211 may be implemented, e.g., in a microcontroller or other programmable processing device that is positioned between a CPU (e.g., CPU 205) and the graphics hardware (e.g., such as GPU 215). Firmware 211 may comprise various logic modules that implement any desired functionality. In some embodiments, firmware 211 may comprise a normalization logic module 212 and a balancing logic module 213. Unlike the graphics hardware resource allocation system 200 discussed above with reference to FIG. 2., firmware 211 is tasked with the arbitration of command queues across executing applications before they reach the graphics hardware.

In some embodiments, firmware 211 may be used to enforce an equitable treatment across executing applications. For example, if two applications were executing, each application would be granted a 50% share of the graphics hardware resources—even if one of the two applications submitted many more command queues than the other application. As a further example, if three applications were executing, each application would be granted a 33.3% share of the graphics hardware resources, and so forth.

In prior graphics hardware resource allocation systems, arbitration was only enforced at a data master level. In other words, the scheduling logic was confined within a single data master (e.g., just within the fragment data master or just within the compute data master, etc.). A consequence of such systems is that there was no enforcement of the concept of "application-level fairness." In other words, one application could dominate the usage of the graphics hardware resources simply by submitting its work in a much larger number of command queues. Thus, according to some embodiments, firmware 211 may be used to enforce application-level fairness, in order to arbitrate a controlled distribution of the graphics hardware's resources at a command queue-level, irrespective of what types of work are included in the command queue. (Recall that a given command queue may target any one or more data masters.)

In some embodiments of graphics hardware resource allocation system 300, a normalization logic 212 module may be used to perform an initial QoS normalization across all executing applications. In other words, each command queue for an executing application may be given a QoS target (or have a QoS target that is programmed by a developer), which may, e.g., be expressed in terms of a qualitative level (e.g., "High" versus "Medium" versus "Low") or a quantitative value (e.g., at least 75% of the GPU's available processing time, at least 20% of the GPU's available processing time, at least 5% of the GPU's available processing time, etc.). In some instances, qualitative levels may need to be converted to quantitative values by the normalization logic 212 before a normalized QoS target value may be computed (e.g., "High"=75%, "Medium"=20%, and so forth). Thus, if, for example, a given command queue for an executing application has a QoS setting such that it should be granted at least 80% of the GPU's available processing time in a given frame, but there are four total applications executing on the GPU at the present time, then the given command queue's QoS setting may be reduced by a factor of four, i.e., reduced to a normalized value of 20% of the GPU's available processing time (wherein the 20% is also to be shared with any other command queues of the application that have been tagged with the same QoS setting). As mentioned above, according to some embodiments, absent any information to the contrary, each executing application may be treated equitably, although it is also possible to grant certain applications prioritized treatment over other applications, if so desired.

In this way, a given developer may specify the relative desired QoS settings for the various command queues in their applications, although they would not have control over what overall percentage of the graphics hardware's resources their application will be granted relative to the other applications that are executing concurrently. In certain embodiments, improved overall graphics performance may be achieved due to the present system's aforementioned capability to grant individual developers the ability to specify relative desired QoS settings for the various command queues in their applications. For example, certain types of graphics work (e.g., rendering) may have strict frame deadlines, such that it would be undesirable for the work not to be performed within the duration of each frame (e.g., resulting in dropped frames), whereas, with other types work (e.g., lighting work), it may be less noticeable if the work is performed by every second frame or every third frame rendered to the display. By allowing the developer the ability to independently set the relative QoS levels of the various command queues utilized in their applications, the system can have a greater chance of ensuring higher priority work has access to a sufficient amount of the graphics hardware's resources, such that it is able to be performed within the desired time interval (e.g., within a single frame).

In some embodiments of graphics hardware resource allocation system 300, a balancing logic 213 module may be used to track the current utilization of graphics hardware resources by each active command queue. Further, the balancing logic 213 may also be configured to compare the current utilization for a given command queue against the given command queue's respective normalized target utilization. In some embodiments, as long as a command queue's current utilization rate is below its normalized target utilization rate, it may be maintained in an active status, and thus allowed to continue to place its commands onto the various respective data masters of the graphics hardware. By contrast, any command queues that have exceed their respective normalized target utilizations may be moved to an inactive status for the duration of the current frame, i.e., prohibited from placing further commands onto the graphics hardware for execution. According to some embodiments, to provide further efficiencies, if there are command queues that have been moved to an inactive status for the duration of the frame, but there are still processing cycles remaining in the current rendering frame after the work from all the active command queues has been submitted (and/or reached their normalized target utilizations), then the work from one or more of the inactive command queues may also be submitted to the graphics hardware for execution for the duration of the frame.

According to some embodiments, as the work begins to be placed on the graphics hardware, the graphics hardware may provide a feedback signal 214B (sometimes referred to as a "billing feedback") to the firmware 211 via a graphics hardware interface, so that the balancing logic 213 may maintain an accurate valuation of the current utilization levels for each command queue, thus driving the decision of when the firmware 211 may decide to move a given command queue from an active status to inactive status. The decision of when a particular command queue may no longer be permitted to target the data masters of the graphics hardware with its commands for a given frame may be communicated via the graphics hardware interface, e.g., by another signal 214A. According to some embodiments, with the start of each new frame (sometimes referred to as a "billing period"), the work from the previous frame may be cleared from the graphics hardware's slots, so that each concurrently running application and command queue again has the chance to submit its commands to the graphics hardware for execution according to the specified QoS priority settings for its command queues. Doing so may help to prevent a single application (or an especially large command queue) from dominating the utilization of the graphics hardware resources for multiple frames in a row, effectively starving the other applications and command queues from access to the graphics hardware.

According to other embodiments, at any point in time during the processing of a given frame, the graphics processor may consider the current utilization for each data master and determine how much more usage of the graphics hardware a given data master may need to reach its utilization target within the current frame and re-program the utilization of slots 235 accordingly. For example, if the vertex data master was still 30% short of its target utilization, and the compute data master was only 10% short of its target utilization for a given frame, then the remaining graphics hardware resources could be divided in a 3:1 ratio between the vertex data master and the compute data master for the duration of the frame, in an attempt to help each data master reach its target utilization. According to some embodiments, the desired utilization splits across the various data masters may be programmed into one or more QoS registers. For instances when there is contention between data masters running the same command queue, the utilization splits may comprise ratios, e.g., fixed ratios loaded at boot time. For example, in one embodiment, the vertex data master may take 30% of the utilization, the pixel data master may take 50% of the utilization, and the compute data master may take 20% of the utilization.

Figures 4A, 4B, 9:
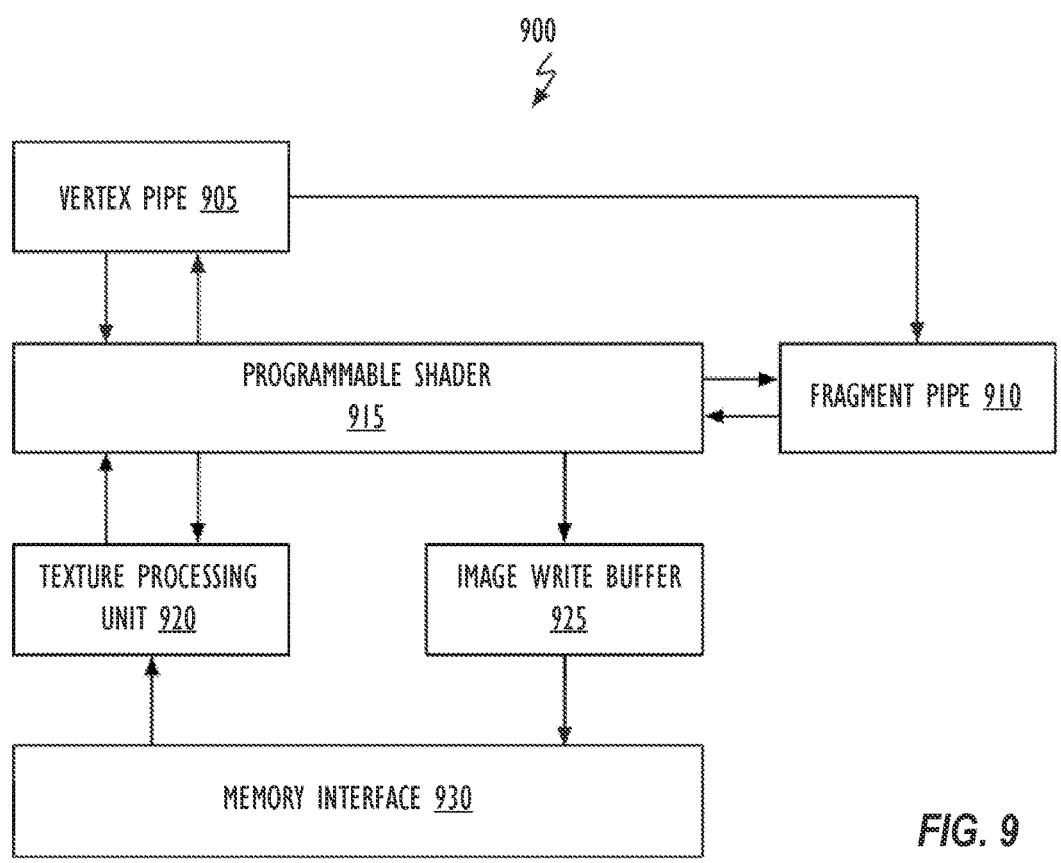
FIG. 4A depicts an embodiment of per-application command queue quality of service (QoS) settings, in the form of tables storing target utilization and normalized target utilization values.
FIG. 4B depicts an embodiment of a cross-application command queue utilization table for a given graphics hardware device.
FIG. 9 is a simplified block diagram illustrating one embodiment of a graphics processor.

FIG. 4A is an illustration of per-application command queue quality of service (QoS) settings, in the form of tables storing target utilization and normalized target utilization values. For example, Table 400 relates to a first application, "Application 0" executing on a given device, "Device A." As illustrated, Application 0 possesses three command queues (CQ0, CQ1, and CQ2). Each of the command queues produced by Application 0 has been given a target utilization value, e.g., via a QoS setting specified by the developer or other system defaults. In particular, CQ0 has been tagged with a QoS setting that specifies that command queues at this particular priority level should fairly share approximately 50% of the remainder of the graphics hardware's resources (e.g., for a given frame). Likewise CQ1 has been tagged with a QoS setting that specifies that command queues at this particular priority level should fairly share approximately 30% of the remainder of the graphics hardware's resources, and CQ2 has been tagged with a QoS setting that specifies that command queues at this particular priority level should fairly share approximately 20% of the remainder of the graphics hardware's resources. It is to be understood that the percentages used in FIG. 4A are merely illustrative, and that any desired target utilization rates may be specified in a given implementation.

Table 405 relates to a second application, "Application 1" executing on "Device A." As illustrated, Application 1 possesses just two command queues (labeled CQ3 and CQ4, for ease of illustration). CQ3 and CQ4 have been tagged with QoS settings specifying a desired 20% and 80% utilization of the graphics hardware's remaining resources, respectively. As may now be appreciated, in the example of FIG. 4A, there are two executing applications on Device A, meaning that an equitable split between the two applications will results in normalized target utilization values that are divided by 2 from their original values. In other words, as shown in the "Normalized Target Utilization" column in tables 400 and 405, CQ0's target utilization has been normalized from 50% to 25%; CQ1's target utilization has been normalized from 30% to 15%; CQ2's target utilization has been normalized from 20% to 10%; CQ3's target utilization has been normalized from 20% to 10%; and CQ4's target utilization has been normalized from 80% to 40%. As described above, a given developer could use a single command queue or a multiplicity of command queues for a given application.

FIG. 4B is an embodiment of a cross-application command queue utilization table 410 for a given graphics hardware device. As described above, utilization table 410 may be produced by firmware 211, and may be used to track the current utilization rates of each command queue that is placing commands onto the graphics hardware. In particular, in FIG. 4B, each of the five command queues (CQ0-CQ4) are labeled as being in an active status. This is because no command queue's current utilization rate has exceeded its normalized target utilization rate (i.e., for the current frame). Thus, as described above, each command queue may continue to place its work onto the slots of the graphics hardware's data masters in any order. However, once a given command queue has reached its normalized target utilization rate for a given frame, it may be dropped into an inactive status. For example, as shown in grayed out text in table 410, once CQ3 reaches its normalized target utilization rate of 10% of the graphics hardware's resources, it may be dropped down to an inactive status, at which point CQ3 will not be able to load any further commands onto the graphics hardware for the duration of the current frame.

Figure 5:
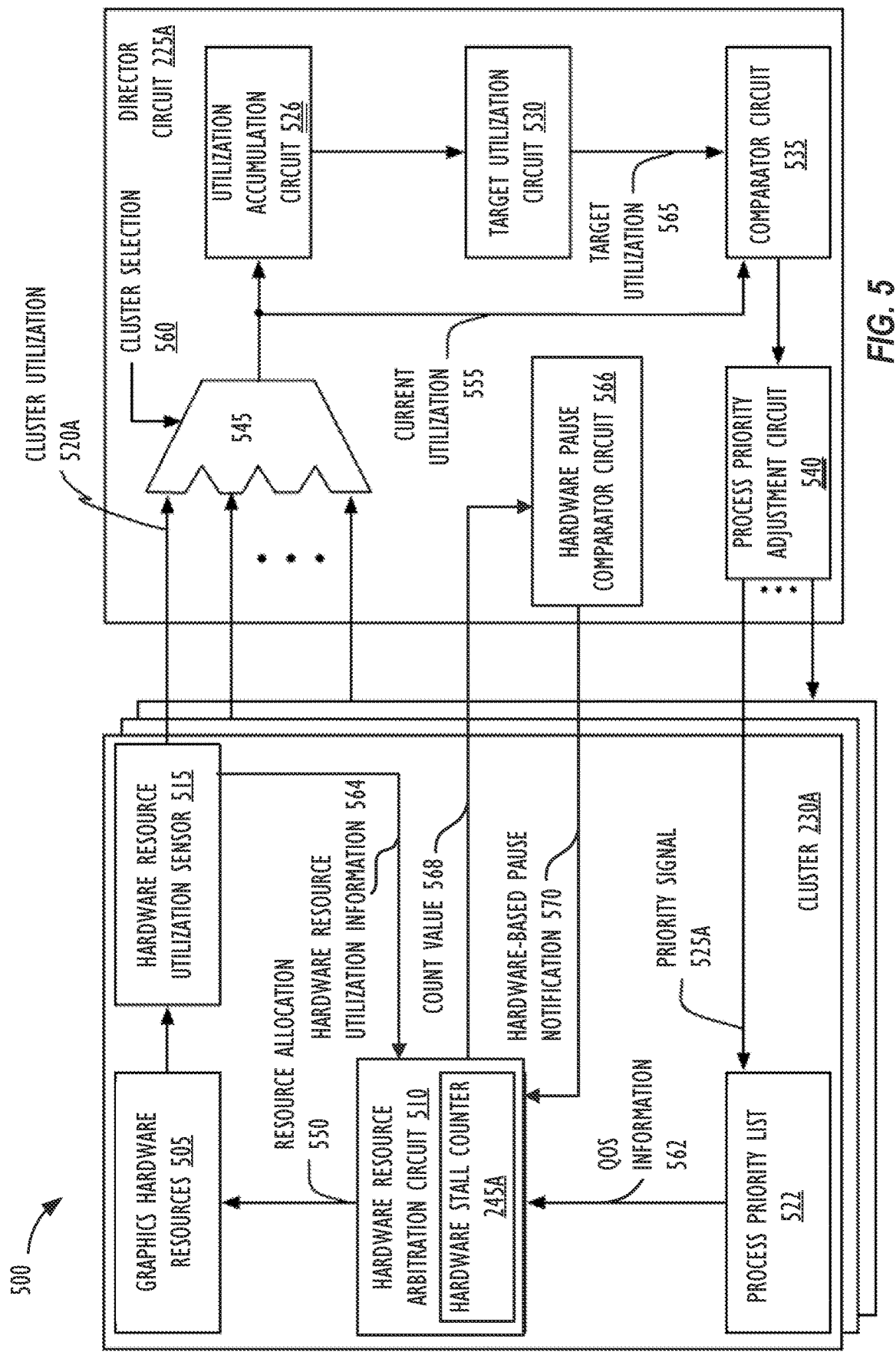
FIG. 5 is a block diagram illustrating another embodiment of a graphics hardware resource allocation system, which corresponds to the graphics hardware resource allocation system shown in FIG. 1.

FIG. 5 is a block diagram illustrating another embodiment of a graphics hardware resource allocation system 500, which corresponds to the graphics hardware resource allocation system 108 shown in FIG. 1. With reference to FIGS. 2 and 3, cluster 230A and director circuit 225A shown in FIG. 5 may be part of a larger processing system, and for clarity's sake, various portions of a complete system are not shown. In the illustrated embodiment, cluster 230A includes graphics hardware resources 505, hardware resource arbitration circuit 510, hardware resource utilization sensor 515, and process priority list 522. The director circuit 225A includes utilization accumulation circuit 526, target utilization circuit 530, comparator circuit 535, process priority adjustment circuit 540, and switching circuit 545. In some embodiments, cluster 230A may include multiple instances of hardware resource utilization sensor 515, corresponding to various director circuits 225. In another embodiment, rather than process priority adjustment circuit 540 communicating with multiple clusters 230, director circuit 225A may include multiple instances of process priority adjustment circuit 540. In some embodiments, other clusters 230, director circuit 225, or both may not include various respective illustrated portions of cluster 230A and/or director circuit 225A. For example, target utilization circuit 530 may correspond to both director circuit 225A and another director circuit 225B (not shown in FIG. 5). In still other embodiments, each cluster 230 includes one or more hardware resource utilization sensors 515 that contain counters.

As previously described, cluster 230A may receive work from one or more processes via data masters 220. Using FIGS. 2 and 3 as an example, a set of data masters (not shown in FIG. 5) may be assigned to break down commands from a particular process into work. The clusters 230 may execute the work by utilizing graphics hardware resources 505 (e.g., registers, execution cores, logic units, cache entries, program state storage circuitry such as that used as a program counter, etc.). Work may request more graphics hardware resources than are available. Accordingly, hardware resource arbitration circuit 510 may, via resource allocation information 550, allocate graphics hardware resources 505 between the processes based on QoS information 562 received from process priority list 522. Hardware resource utilization sensor 515 may monitor utilization of the allocated graphics hardware resources 505 by one or more of the processes and may, in response thereto, generate cluster utilization indication 520A. Cluster utilization indication 520A may indicate a portion of the allocated graphics hardware resources 505 that were actually utilized during a given time period (e.g., a sample interval). In some embodiments, some portions of graphics hardware resources 505 (e.g., registers) may be weighted differently from other portions of graphics hardware resources 505 (e.g., execution cores). In the illustrated embodiment, hardware resource utilization sensor 515 may periodically send cluster utilization indication 520A to director circuit 225A (e.g., after every sample interval). Cluster utilization indication 520A may represent a utilization of graphics hardware resources 505 over a specified amount of time (e.g., 1 millisecond, 1 second, 1 frame, or a lifetime of a corresponding process) or a utilization of graphics hardware resources 505 at a specific time.

Director circuit 225A may receive cluster utilization indications 520A or other information from clusters 230 (e.g., cluster 230A). The cluster utilization indications 520A may indicate utilization of graphics hardware resources by one or more processes at the respective cluster. In the illustrated embodiment, director circuit 225A may receive cluster utilization indication 520A at switching circuit 545. Switching circuit 545 may, in turn, output cluster utilizations as current utilization 555 based on cluster selection 560. In some embodiments, switching circuit 545 may comprise one or more multiplexers. Current utilization 555 may be sent to utilization accumulation circuit 526 and to comparator circuit 535. Utilization accumulation circuit 526 may determine the utilization of graphics hardware resources (e.g., at clusters 230A) by a process over a particular amount of time (e.g., an epoch interval). In the illustrated embodiment, utilization accumulation circuit 526 may output an indication of the utilization of the graphics hardware resources to target utilization circuit 530.

Target utilization circuit 530 may use the utilization of the graphics hardware resources to identify a target utilization 565 for a particular cluster 230 (e.g., cluster 230A). By way of example, target utilization circuit 530 may indicate a target utilization of graphics hardware resources 505 for a process monitored by hardware resource utilization sensor 515 when current utilization 555 corresponds to cluster utilization indication 520A. Target utilization 565 may indicate a number of resources to be given to the process during a next specified period of time (e.g., until target utilization 565 is recalculated for graphics hardware resources 505). In some embodiments, target utilization circuit 530 may determine target utilization 565 based on a utilization of graphics hardware resources by one or more other processes (e.g., received at cluster 230A from process queues other than the process corresponding to director circuit 225A). In other embodiments, target utilization circuit 530 may determine target utilization 565 by tracking a number of threads of the process that are consumed. In still other embodiments, one or more software components (e.g., executing at director circuit 225A or at one or more processors external to director circuit 225A) may be used to determine target utilization 565. In yet other embodiments, target utilization circuit 530 may determine target utilization 565 on a per data master 220 basis. For example, each data master may have a separate utilization target and/or priority level relative to the other data masters, e.g., as programmed or specified by software and/or firmware in communication with the graphics hardware, and as may be stored in one or more hardware registers.

Comparator circuit 535 may compare current utilization 555 to target utilization 565 and may output a result to execute priority adjustment circuit 540. Additionally, in some embodiments, comparator circuit 535 may convert current utilization 555 into a format appropriate for target utilization 565 (e.g., a percentage). In one embodiment, the result may indicate a difference between current utilization 555 and target utilization 565. The result may indicate that a difference between current utilization 555 and target utilization 565 is within a specified range (e.g., current utilization 555 is at least 10% larger than target utilization 565, current utilization 555 and target utilization 565 are less than 10% of each other, or current utilization is at least 10% smaller than target utilization 565). In other embodiments, several ranges may be used (e.g., current utilization 555 is 10-20% larger target utilization 565, current utilization 555 is 21-30% larger target utilization 565, etc.). In still other embodiments, an output of comparator circuit 535 may indicate a number of credits. As used herein, the number of credits may indicate a specified amount of graphics hardware resources allocated to the process per a specified number of execution cycles, as compared to an expected amount of graphics hardware resources allocated to the process per the specified number of execution graphics processor clock cycles.

Process priority adjustment circuit 540 may determine whether to dynamically adjust, via priority signal(s) 525, a priority of one or more processes at one or more clusters 230 based on the result from comparator circuit 535. In some cases, at least some of the one or more clusters 230 where the priority is adjusted may be different from the cluster 230 corresponding to current utilization 555. As noted above, the result may indicate that a difference between current utilization 555 and target utilization 565 is within a specified range (or outside a specified range). In response to the difference being within the specified range, process priority adjustment circuit 540 may determine not to adjust the priority of the process at one or more of the clusters 230. In some other embodiments, priority signal 525A may be sent to process priority list 522, indicating no adjustment to the priority should be made. In other embodiments, priority signal 525A may not be sent. In response to the result being outside the specified range and current utilization 555 being larger than target utilization 565, process priority adjustment circuit 540 may reduce the priority of the process at one or more clusters 230 (e.g., via priority signal 525A). In response to the result being outside the specified range and current utilization 555 being smaller than target utilization 565, process priority adjustment circuit 540 may increase the priority of the process at one or more clusters (e.g., via priority signal 525A). The priority may be adjusted, for example, by a fixed amount or may be based on the difference between current utilization 555 and target utilization 565.

In some cases, process priority adjustment circuit 540 may track a total difference for the process based on outputs from comparator circuit 535 (e.g., multiple outputs corresponding to a single cluster, outputs corresponding to multiple clusters, or both). As noted above, in some embodiments, the results from comparator circuit 535 may indicate a number of credits. Process priority adjustment circuit 540 may track a total number of credits for a process. Additionally, process priority adjustment circuit 540 may adjust the priority of the process based on the total number of credits exceeding or falling below various specified thresholds. The adjusted priority may be used by hardware resource arbitration circuit 510 in future allocation cycles to reallocate graphics hardware resources 505. As discussed above, in some embodiments the priority may be adjusted such that allocation of graphics hardware resources 505 to executes at cluster 230A trends towards a specified ratio over a period of time (e.g., 1 millisecond or 1 second), as opposed to the allocation being the specified ratio.

In still other embodiments, process priority adjustment circuit 540 may use additional information to adjust the priority. For example, process priority adjustment circuit 540 may receive results from comparator circuits corresponding to other processes (e.g., received at cluster 230A from other process queues than the process corresponding to director circuit 225A). As another example, process priority adjustment circuit 540 may save information from previous results provided by comparator circuit 535. As a third example, process priority adjustment circuit 540 may receive an indication of a number of graphics hardware resources requested by the process at one or more of clusters 230. As noted above, in some cases, various processes may have specified ranges of priorities. The specified ranges may be based on the processes themselves (e.g., based on a process type), based on a priority requested by the process, based on a process queue from which the process was received, or based on other factors. The specified ranges may differ at different clusters. In light of these differences, process priority adjustment circuit 540 may adjust priorities based on the specified ranges such that the adjusted priorities are in the specified ranges.

In some cases, process priority adjustment circuit 540 may identify the process as being ill-behaved or hung, which indicates the possibility of graphics processor starvation. For example, in response to determining the current utilization 555 for a first process exceeds target utilization 565, determining that the priority of the process is already the lowest priority that can be assigned, and determining that one or more other processes are receiving an insufficient number of resources, process priority adjustment circuit 540 may identify the first process as being ill-behaved. As another example, in response to determining that a second process is failing to utilize an allocated portion of graphics hardware resources 505 despite being allocated a requested portion of graphics hardware resources 505 for a particular amount of time, process priority adjustment circuit 540 may identify the second process as being hung. The process may be identified as ill-behaved or hung based on a difference between current utilization 555 and target utilization 565 exceeding one or more specified amounts. In various embodiments where credits are used, a process may be identified as being ill-behaved or hung in response to the number of credits exceeding or falling below respective specified thresholds. In some embodiments, in response to identifying a process as being ill-behaved or hung, process priority adjustment circuit 540 may indicate to one or more of clusters 230 that a context switch should occur for the process or that the process should be terminated. The indication may be sent via one or more priority signals 525 (e.g., setting the priority to a particular value) or to one or more other devices (e.g., to hardware resource arbitration circuit 510 directly). In some embodiments, the context switch may be implemented by removing particular work from the graphics hardware's slots 235, e.g., on the basis of determining that a given command queue (or a given data master) has exceeded its target utilization for a given time period.

FIG. 5 illustrates that the hardware resource arbitration circuit 510 includes a hardware stall counter 245A for tracking designated data masters. Recall that a set of data masters may be assigned to receive commands from a given process. The director circuit 225A may designate one of the data masters to be tracked with the hardware stall counter 245A. In FIG. 5, the process priority adjustment circuit 540 may include within the priority signal 525A the designated data master. The process priority adjustment circuit 540 determines the designated data master based on the comparison between the current utilization 555 and target utilization 565. As an example, the process priority adjustment circuit 540 may assign the data master that has the largest difference between the current utilization 555 and target utilization 565 as the designated data masters.

After the process priority list 522 receives the priority signal 525A identifying the designated data master, the process priority list 522 sends QoS information 562 to the hardware resource arbitration circuit 510. In one embodiment, the QoS information 562 may include a list of data masters sorted by priority, where the priority indicates which data master is the designated data master. For example, in FIG. 5, the highest priority data master within the list could indicate the designated data master. In embodiments where the list includes multiple designated data masters, the list could indicate that data masters with the higher priorities in the list are designated data masters. Each time the designated data master changes within the list, the count value for the hardware stall counter 145 is reset back to zero. Using FIG. 2 as an example, at a first point in time, QoS information 562 sent to the hardware resource arbitration circuit 510 indicates that data master 202A has the highest priority, and thus, is the designated data master. Afterwards, at a second point in time, the process priority list 522 sends QoS information 562 to the hardware resource arbitration circuit 510 that changes in the highest priority data master to data master 220W. When this occurs, the count value for hardware stall counter 245A is reset back to zero.

At each specified time period (e.g., one or more graphics processor clock cycles), the hardware resource arbitration circuit 510 receives graphics hardware resource utilization information 564 from the hardware resource utilization sensor 515. The hardware resource arbitration circuit 510 uses the graphics hardware resource utilization information 564 to determine whether the designated data master was able to execute its available work using the graphics hardware resource 505. If the designated data master was unable to submit its work, the hardware stall counter 245 increments. If the designated data master was able to execute work, the hardware stall counter 245 does not change. The count value 568 for hardware stall counter 245 may then be sent to the director circuit 225A. The hardware resource arbitration circuit 510 may send the count value to the director circuit 225A periodically and/or each time the count value for the hardware stall counter 245 changes. Although FIG. 5 illustrates that the hardware stall counter 245 is part of the hardware resource arbitration circuit 510, other embodiments could have the hardware stall counter 245 separate from the hardware resource arbitration circuit 510 and/or belong within other components of the cluster 230A (e.g., hardware resource utilization sensor 515).

In FIG. 5, a hardware pause comparator circuit 566 receives the count value 568 from hardware stall counter 245A and other hardware stall counters 245 located in other clusters 230. The hardware pause comparator circuit 566 aggregates the count values 568 received from the hardware stall counters 245 to generate an overall count value. As discussed with reference to FIG. 2, the overall count value can be computed based on one or more statistical operations. The hardware pause comparator circuit 566 then compares the overall count value to one or more thresholds to determine whether to generate a hardware driven pause notification 570. In FIG. 5, the hardware pause comparator circuit 566 sends hardware driven pause notifications 570 back to the hardware resource arbitration circuit 510. In response, the hardware resource arbitration circuit 510 can dynamically modify the resource allocation information 550 sent to graphics hardware resources 505.

After implementing the hardware driven pause and/or software-based pause, the process priority adjustment circuit 540 may dynamically adjust the priorities and/or assign a new designated data master as current utilization 555 updates. In particular, current utilization 555 will change as work for the non-designated and/or lower priority data masters do not execute. Based on the change in current utilization 555, process priority adjustment circuit 540 sends priority signals 525A that updates QoS information 562 to include newly designated data masters. In one embodiment, when hardware resource arbitration circuit 510 receives the new designated data master, the hardware resource arbitration circuit 510 may un-pause and resume executing work associated with the non-designated and/or lower priority data master. Recall that the hardware stall counter 245A can reset to a specified reset count value (e.g., a count value of zero) because of the new designated data master.

Figure 6:
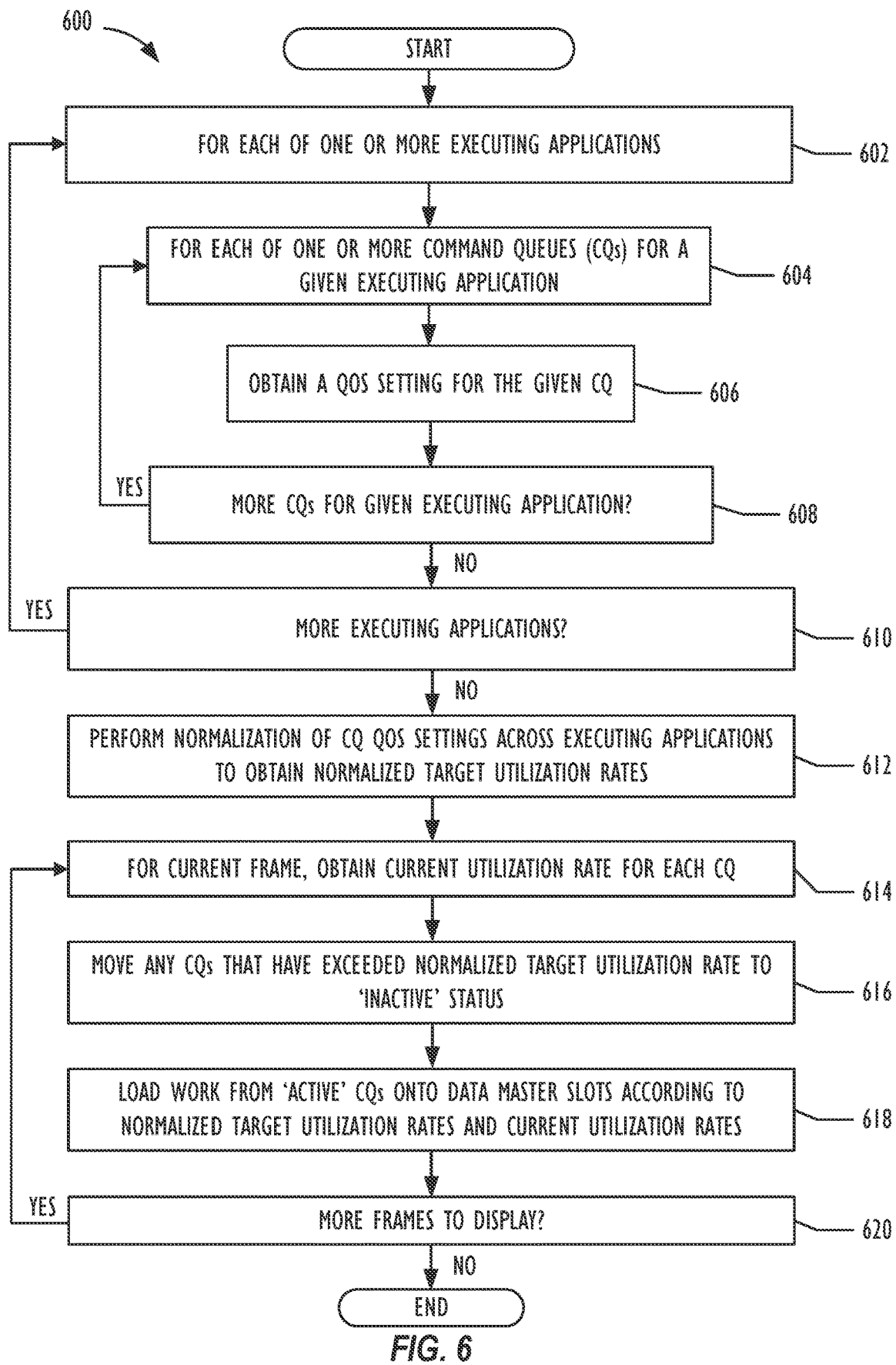
FIG. 6 is a flow diagram of operation for allocating graphics hardware resources to enforce QoS settings for command queues within a given application and fairness across the command queues of all executing applications.

FIG. 6 is a flow diagram of operation 600 for allocating graphics hardware resources to enforce QoS settings for command queues within a given application and fairness across the command queues of all executing applications. In some embodiments, operation 600 may be initiated or performed by one or more processors in response to one or more instructions stored in a computer-readable storage medium. For example, operation 600 may be performed by the graphics hardware resource allocation system 108 shown in FIG. 1. The use and discussion of FIG. 6 is only an example to facilitate explanation and is not intended to limit the disclosure to this specific example. For example, although FIG. 6 illustrates that the blocks within operation 600 are implemented in a sequential order, operation 600 is not limited to this sequential order.

Because different data masters have different characteristics of acquiring resources and dispatching their kicks to the graphics processor, they may be considered heterogeneous. With reference to FIGS. 2, 3, and 5, a potential side-effect of this is that regardless of what priority a data master assigns to a kick (e.g., data master 220A), the director circuit 225 to which that kick is assigned (e.g., director circuit 225) may grant a lower priority kick from a different data master 220 more resources (e.g., data master 220W). The phenomenon of lower priority kicks being allocated more resources than higher priority kicks is referred to herein as "sneaking."

At block 602, operation 600 may initially obtain each of one or more executing applications and, for each application, begin to iterate over the respective application's command queues via the execution of blocks 604-608. In particular, at block 604, operation 600 may iterate over each of one or more command queues for the respective application. At block 606, operation 600 may obtain a QoS setting for each respective command queue. As long as there are more command queues to process for a respective application (i.e., "YES" at block 608), the operation 600 may continue its processing by returning to block 604 and obtaining the next command queue. When there are no more command queues to process for a respective application (i.e., "NO" at block 608), the operation 600 may continue its processing by proceeding to block 610 to determine whether there are further executing applications to process. As long as there are more applications to process command queues for (i.e., "YES" at block 610), the operation 600 may continue its processing by returning to block 602 and obtaining the next application. When there are no more applications to process (i.e., "NO" at block 610), the operation 600 may continue its processing by proceeding to block 612.

At block 612, operation 600 may perform a normalization operation on the obtained QoS settings across the various executing applications to obtain normalized target utilization values. As described above, e.g., with reference to FIGS. 4A and 4B, such values may be stored in the form of a table in memory, and the normalized target utilization values may be stored in the form of absolute values or relative percentages. In some embodiments, normalization may comprise allocating hardware resources equitably across executing applications, regardless of the number of command queues submitted by a given application.

Next, at block 614, for each frame, the operation 600 may obtain the current utilization rates for each command queue from the graphics hardware. Based on a comparison of the current utilization rates and the normalized target utilization rates, at block 616, operation 600 may move any command queues that have exceeded their normalized target utilization rates for the current frame to an inactive status, meaning they can no longer attempt to place their commands onto the graphics hardware for execution for the duration of the current frame. At block 618, work from any active command queues may then be loaded onto the appropriate data master's slots in any order, according to the normalized target utilization rates and the current utilization rates. It is noted that, according to some embodiments, blocks 614 and 616 described above may take place at a sub-frame granularity, i.e., the obtaining of current utilization rates and comparisons to target utilization rates may occur multiple times for a given frame. For example, the utilization rate comparisons may occur as each individual command completes its execution on the graphics hardware and/or at a regular cadence, such as every 500 microseconds or every millisecond.

At the conclusion of the graphics processing for a given frame, as long as there are more graphics frames to be displayed (i.e., "YES" at block 620), the operation 600 may continue its processing by returning to block 614 and resetting the current and normalized target utilization rates for each command queue, e.g., with the values presented by block 612. When there are no more graphics frames to be displayed (i.e., "NO" at block 620), the operation 600 may end.

Other Illustrative Systems

Figure 7:
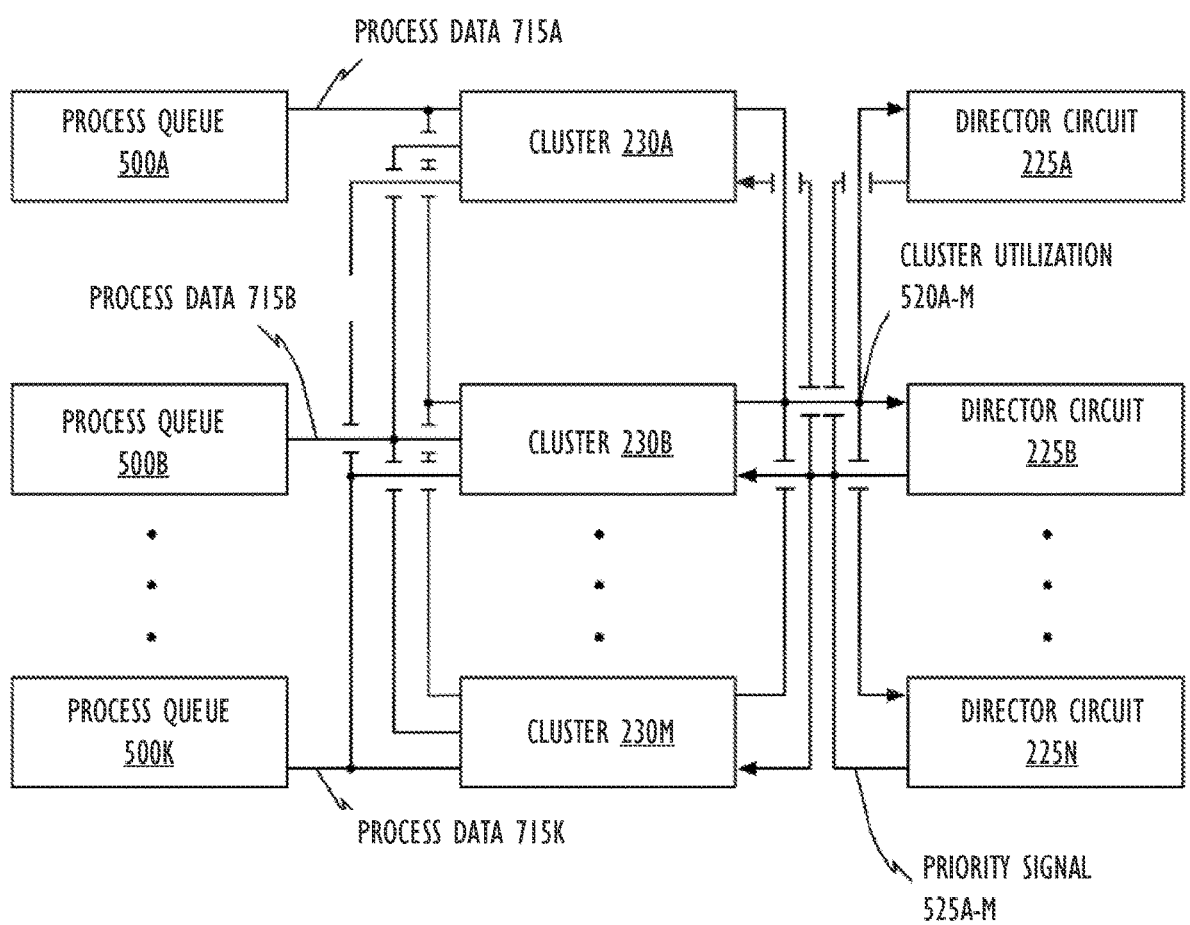
FIG. 7 is a block diagram illustrating one embodiment of a computing device that monitors and controls, in real-time, a process's QoS.

FIG. 7 is a block diagram illustrating one embodiment of a computing device 702 that monitors and controls, in real-time, a process's QoS. FIG. 7 illustrates process queues 700A-K, clusters 230A-M, and director circuits 225A-N, where clusters 230A-M and director circuits 225A-N are part of the graphics hardware resource allocation system 108. Although process queues 700A-K, clusters 230A-M, and director circuits 225A-N are interconnected in a particular manner in FIG. 7. In other embodiments, process queues 700A-K, clusters 230A-M, and director circuits 225A-N may be connected in other manners (e.g., process queue 700K may not be connected to cluster 230A). In various embodiments, different numbers of at least one of process queues 700A-K, clusters 230A-M, or director circuits 225A-N may be present. In various other embodiments, some or all of the elements shown in FIG. 7 may be part of one or more components of the graphics hardware resource allocation system 108.

Process queues 700A-K may store data for respective processes and may provide the data to clusters 230A-M as process data 715A-K. Process data of a single process queue may be provided to a single cluster or to multiple clusters. Process data provided to multiple clusters may be the same or different. Additionally, multiple process queues may provide process data to a single cluster. For example, process queue 700A may provide a first portion of process data 715A (e.g., first kick) to cluster 230A and a second portion of process data 715A (e.g., second kick) to cluster 230M. Further, during a single execution cycle, process queue 700B may provide a first portion of process data 715B (e.g., a third kick) to cluster 230M and a second portion of process data 715B (e.g., a fourth kick) to cluster 230B. Process queues 700A-K may correspond to different functional aspects of the system. For example, in some embodiments, process queues 700A-K may correspond to various data master functions of a graphics processor. Processes may be allocated to execute process queues 700A-K based on the functions performed by the processes. In the illustrated embodiment, process data 715A includes data for only a single process. In some cases, the data may correspond to multiple threads of a single process. In other embodiments, process data 715A may include data for multiple processes. In still other embodiments, process queues 700A-K may be software queues. In other embodiments, process queues 700A-K may be hardware queues. In yet other embodiments, some of process queues 700A-K may be software queues while others may be hardware queues.

Clusters 230A-M may include graphics hardware resources used to perform various computing actions using process data. As noted above, in some cases clusters 230A-M may receive process data from multiple processes. For example, cluster 230M may receive a portion of process data 715A and a portion of process data 715B. When process data corresponding to multiple processes is received, clusters 230A-M may allocate respective graphics hardware resources to the processes based on priorities of the processes and the determined hardware utilization. In various embodiments, the priorities may be determined based on at least one of a process type, a priority requested by the process queue, or a queue from which the process is received. For example, processes relating to a user interface may have a specified range of priorities (e.g., at least one of a specified minimum priority, a specified maximum priority, or a specified initial priority). As another example, processes received from a vertex queue may also have a specified range of priorities. In some cases, the graphics hardware resources of clusters 230A-M may not be utilized as indicated by the priorities. In accordance with one or more embodiments, clusters 230A-M may periodically indicate utilization of the graphics hardware resources by the various processes to director circuits 225A-N via cluster utilizations 720A-M (e.g., based on utilization sensor output over one or more sample intervals and/or one or more epoch intervals). Cluster utilizations 720A-M may represent a utilization of graphics hardware resources for a particular amount of time (e.g., an epoch interval) or may represent an instantaneous utilization of graphics hardware resources. In response to cluster utilizations 720A-M, clusters 230A-M may receive priority signals 725A-M, which may modify one or more priorities at clusters 230A-M. Clusters 230A-M may reallocate the graphics hardware resources based on the modified priorities. In some embodiments, the graphics hardware resources may be reallocated to be within a specified range over a specified amount of time. As an example, in some embodiments, cluster 230A may include twenty registers and may further include requests from a first process and a second process. The priorities of the processes may indicate that the first process should receive eighty percent of the registers (sixteen registers) and the second process should receive twenty percent of the registers (four registers). However, the first process may be unable to proceed with fewer than ten registers and the second process may be unable to proceed with fewer than six registers. Because, in this example, the initially allocated four registers for the second process is insufficient for it to execute, cluster utilizations 720A-M may indicate that the second process is not utilizing its allocated registers. In response, priority signals 725A-M may adjust the priorities so the second process is not allocated any of the registers half of the time and receives forty percent of the registers (eight registers) the other half of the time. Under this allocation, the first process receives 10 registers half the time and 20 registers the other half of the time while the second process receives 10 registers half the time and no registers the other half of the time. As a result, this adjustment may allow both processes to make progress.

Director circuits 225A-N may receive cluster utilizations 720A-M and may determine whether to adjust the priorities at clusters 230A-M. In particular, as described further below, director circuits 225A-N may determine, for a particular process, its actual utilization over a given time period (e.g., an instantaneous utilization, a utilization based on one or more sample intervals, or a utilization based on one or more epoch intervals). Based on a comparison between a target utilization and a current or actual utilization, one or more of director circuits 225A-N may adjust a priority of a process at one or more of clusters 230A-M. As a result, processes may receive an allocated amount of graphics hardware resources over a window of time (e.g., an interval). Additionally, director circuits 225A-N may detect that one or more processes are ill-behaved (e.g., requesting resources and failing to utilize them) or hung (e.g., failing to continue execution). In some cases, director circuits 225A-N may indicate, via priority signals 725A-M or via another signal that a context switch should occur with regard to a process, removing the process from clusters 230A-M. In some embodiments, each director circuit 225A-N corresponds to a different process. Accordingly, where each of process queues 700A-K sends process data for a single process to one of clusters 230A-M at a time, director circuits 225 may correspond to different process queues 700.

Figure 8:
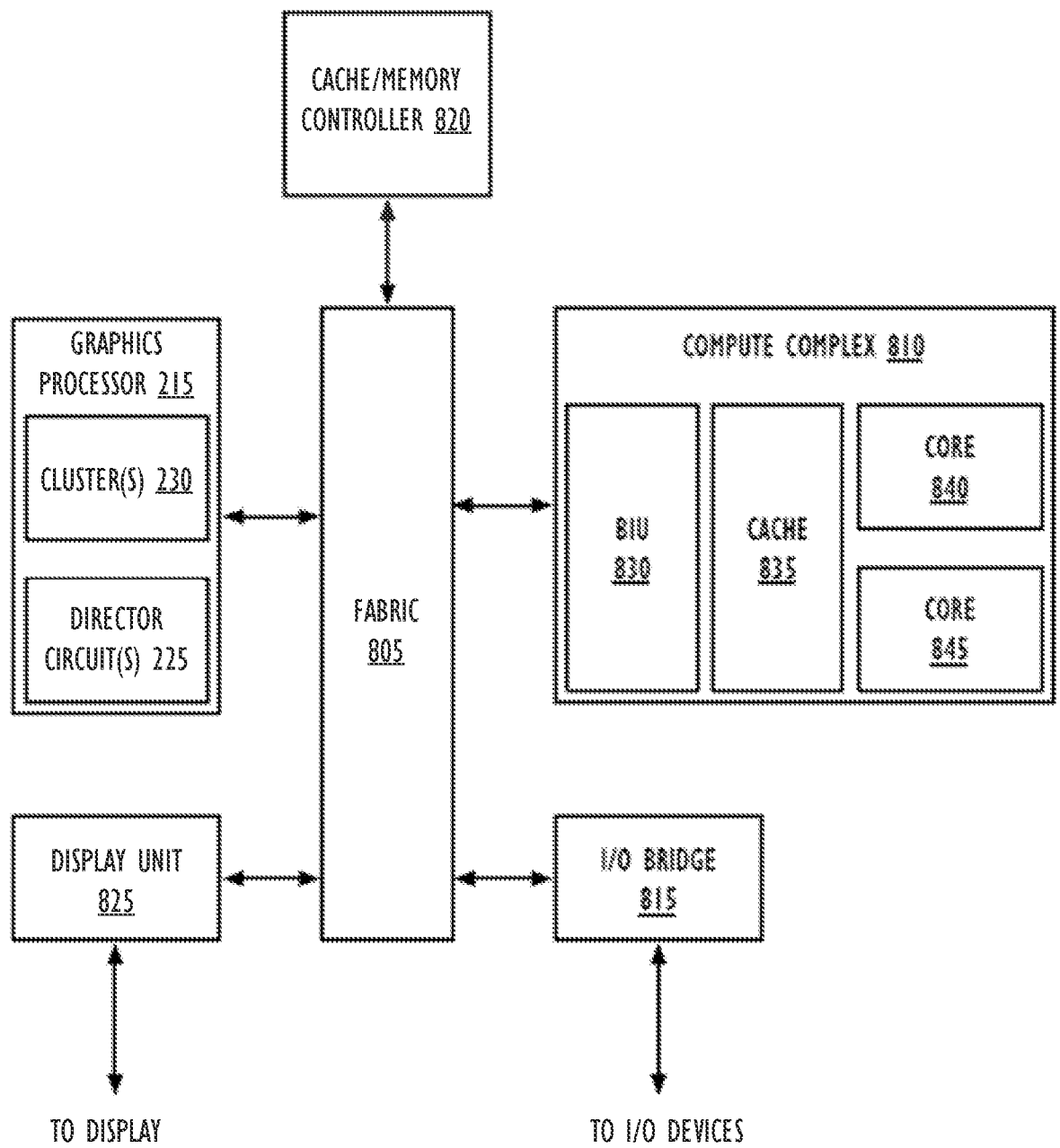
FIG. 8 is block diagram illustrating an embodiment of a computing system that includes at least a portion of a processing circuit hardware resource allocation system.

Turning next to FIG. 8, a block diagram illustrating an exemplary embodiment of a computing system 800 that includes at least a portion of a graphics hardware resource allocation system. The computing system 800 includes graphics processor 215 of FIG. 2. In some embodiments, graphics processor 215 includes one or more of the circuits described above with reference to FIG. 2, including any variations or modifications described previously with reference to FIGS. 1-7. For example, in the illustrated embodiment, graphics processor 215 includes cluster(s) 230 and director circuit(s) 225 of FIGS. 2 and 3. In some embodiments, some or all elements of the computing system 800 may be included within a system on a chip (SoC). In other embodiments, computing system 800 may be included in a mobile device. Accordingly, in at least some embodiments, area and power consumption of the computing system 800 may be important design considerations. In the illustrated embodiment, the computing system 800 includes communication's fabric 805, graphics processor 215, compute complex 810, input/output (I/O) bridge 815, cache/memory controller 820, and display unit 825. Although the computing system 800 illustrates graphics processor 215 as being connected to fabric 805 as a separate device of computing system 800, in other embodiments, graphics processor 215 may be connected to or included in other components of the computing system 800.

Additionally, the computing system 800 may include multiple graphics processors 215. The multiple graphics processors 215 may correspond to different embodiments or to the same embodiment. Further, although in the illustrated embodiment, cluster(s) 230 and director circuit(s) 225 are part of graphics processor 215, in other embodiments, cluster(s) 230, director circuit(s) 225, or both may be a separate device or may be included in other components of computing system 800. Fabric 805 may include various interconnects, buses, MUXes, controllers, etc., and may be configured to facilitate communication between various elements of computing system 800. In some embodiments, portions of fabric 805 are configured to implement various different communication protocols. In other embodiments, fabric 805 implements a single communication protocol and elements coupled to fabric 805 may convert from the single communication protocol to other communication protocols internally.

In the illustrated embodiment, compute complex 810 includes bus interface unit (BIU) 830, cache 835, and cores 840 and 845. In some embodiments, cores 840 and 845 may correspond to execution cores of clusters 230. In various embodiments, compute complex 810 includes various numbers of cores and/or caches. For example, compute complex 810 may include 1, 2, or 4 processor cores, or any other suitable number. In some embodiments, cores 840 and/or 845 include internal instruction and/or data caches. In some embodiments, a coherency unit (not shown) in fabric 805, cache 835, or elsewhere in computing system 800 is configured to maintain coherency between various caches of computing system 800. BIU 830 may be configured to manage communication between compute complex 810 and other elements of computing system 800. Processor cores such as cores 840 and 845 may be configured to execute instructions of a particular instruction set architecture (ISA), which may include operating system instructions and user application instructions. I/O bridge 815 may include various elements configured to implement: universal serial bus (USB) communications, security, audio, and/or low-power always-on functionality, for example. I/O bridge 815 may also include interfaces such as pulse-width modulation (PWM), general-purpose input/output (G PIO), serial peripheral interface (SPI), and/or inter-integrated circuit (12C), for example. Various types of peripherals and devices may be coupled to computing system 800 via I/O bridge 815.

In some embodiments, graphics processor 215 may be coupled to computing system 800 via I/O bridge 815. Cache/memory controller 820 may be configured to manage the transfer of data between fabric 805 and one or more caches and/or memories (e.g., non-transitory computer readable mediums). For example, cache/memory controller 820 may be coupled to an L3 cache, which may, in turn, be coupled to a system memory. In other embodiments, cache/memory controller 820 is directly coupled to a memory. In some embodiments, the cache/memory controller 820 includes one or more internal caches. In some embodiments, the cache/memory controller 820 may include or be coupled to one or more caches and/or memories that include instructions that, when executed by one or more processors (e.g., compute complex 810 and/or graphics processor 215), cause the processor, processors, or cores to initiate or perform some or all of the operations described above with reference to FIGS. 1-7. Display unit 825 may be configured to read data from a frame buffer and provide a stream of pixel values for display. Display unit 825 may be configured as a display pipeline in some embodiments. Additionally, display unit 825 may be configured to blend multiple frames to produce an output frame. Further, display unit 825 may include one or more interfaces (e.g., MIPI or embedded display port, eDP) for coupling to a user display (e.g., a touchscreen or an external display).

As used herein, the term "coupled to" may indicate one or more connections between elements, and a coupling may include intervening elements. For example, in FIG. 8, display unit 825 may be described as "coupled to" compute complex 810 through fabric 805. In contrast, in the illustrated embodiment of FIG. 8, display unit 825 is "directly coupled" to fabric 805 because there are no intervening elements.

Referring to FIG. 9, a simplified block diagram illustrating one embodiment of a graphics processor 900 is shown. In the illustrated embodiment, graphics processor 900 includes vertex pipe 905, fragment pipe 910, programmable shader 915, texture processing unit (TPU) 920, image write buffer 925, and memory interface 930. In some embodiments, graphics unit 900 may be configured to process both vertex and fragment data using programmable shader 915, which may be configured to process data (e.g., graphics data) in parallel using multiple execution pipelines or instances. In other embodiments, the multiple execution pipelines correspond to a plurality of execution units of a processing circuit hardware resource allocation system.

Vertex pipe 905 may include various fixed-function hardware configured to process vertex data. Vertex pipe 905 may be configured to communicate with programmable shader 915 to coordinate vertex processing, and to send processed data to fragment pipe 910 and/or programmable shader 915 for further processing. Fragment pipe 910 may include various fixed-function hardware configured to process pixel data. Fragment pipe 910 may be configured to communicate with programmable shader 915 in order to coordinate fragment processing. Fragment pipe 910 may also be configured to perform rasterization on polygons received from vertex pipe 905 and/or programmable shader 915 so as to generate fragment data. Vertex pipe 905 and/or fragment pipe 910 may be coupled to memory interface 930 (coupling not shown) in order to access graphics data.

Programmable shader 915 may be configured to receive vertex data from vertex pipe 905 and fragment data from fragment pipe 910 and/or TPU 920. Programmable shader 915 may be further configured to perform vertex processing tasks on vertex data, including various transformations and/or adjustments of vertex data. By way of example, programmable shader 915 may also be configured to perform fragment processing tasks on pixel data such as texturing and shading. Programmable shader 915 may include multiple execution instances for processing data in parallel.

In various embodiments, portions (e.g., execution units, registers, arithmetic logic units, memory locations, etc.) of programmable shader 915 may be usable by multiple processes (e.g., vertex processing tasks, compute processing tasks and fragment processing tasks). In practice, different portions of programmable shader 915 may be allocated to different processes during execution of those processes. Programmable shader 915 in one or more embodiments may be coupled in any of various appropriate configurations to other programmable and/or fixed-function elements in a graphics unit. The configuration shown in FIG. 9 is illustrative only.

TPU 920 may be configured to schedule fragment processing tasks from programmable shader 915. In some embodiments, TPU 920 may be configured to pre-fetch texture data and assign initial colors to fragments for further processing by programmable shader 915 (e.g., via memory interface 930). In other embodiments, TPU 920 may be configured to provide fragment components in one or more normalized integer formats or one or more floating-point formats. In still other embodiments, TPU 920 may be configured to provide fragments in groups of four (a "fragment quad") in a 2×2 format to be processed by a group of four execution pipelines in programmable shader 915. Image write buffer 925 may be configured to store processed tiles of an image and may further perform final operations to a rendered image before it is transferred to a frame buffer (e.g., in a system memory via memory interface 930). Memory interface 930 may facilitate communication between graphics unit 900 and one or more of various memory hierarchies in various embodiments.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An un-programmed field-programmable gate array (FPGA), for example, would not be considered to be "configured to" perform some specific function, although it may be "configurable to" perform that function after programming.

As used herein, the term "based on" is used to describe one or more factors that affect a determination. This term does not foreclose the possibility that additional factors may also affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose the situation in which the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose the situation in which the performance of A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a processing circuit that includes six clusters, the terms "first cluster" and "second cluster" can be used to refer to any two of the six clusters, and not, for example, to two specific clusters (e.g., logical clusters 0 and 1).

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system-and business-related constraints), and that these goals may vary from one implementation to another. It will also be appreciated that such development efforts might be complex and time-consuming, but would nevertheless be a routine undertaking for those of ordinary skill in the design and implementation of graphics processing systems having the benefit of this disclosure.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by one or more processors and comprising instructions stored thereon to cause the one or more processors to:
   determine one or more applications executing concurrently on a first processor;
   determine one or more command queues for each of the one or more applications;
   generate a utilization table, wherein the utilization table stores a target utilization rate of a graphics processor for each of the one or more command queues for each of the one or more applications;
   normalize each of the target utilization rates in the utilization table, wherein the normalization is based on the number of applications executing concurrently on the first processor;
   obtain a current utilization rate of the graphics processor for each of the one or more command queues for each of the one or more applications; and
   for each of the one or more command queues for each of the one or more applications having a current utilization rate that has not exceeded its respective normalized target utilization rate:
      submit work from the respective command queue to the graphics processor for execution.

2. The non-transitory program storage device of claim 1, wherein each target utilization rate is based, at least in part, on a desired percentage usage of the graphics processor's available processing time for a given time interval.

3. The non-transitory program storage device of claim 1, wherein the instructions further comprise instructions that cause the one or more processors to:
   provide each concurrently executing application an equal share of the graphics processor's resources.

4. The non-transitory program storage device of claim 1, wherein the current utilization rate of the graphics processor for a given command queue comprises: a utilization rate of the graphics processor on the given command queue for a frame the graphics processor is currently rendering.

5. The non-transitory program storage device of claim 1, wherein work from each of one or more command queues for each of the one or more applications targets one or more corresponding data masters of the graphics processor.

6. The non-transitory program storage device of claim 5, wherein each data master of the graphics processor comprises a programmable priority level, wherein the priority level is relative to the other data masters of the graphics processor.

7. The non-transitory program storage device of claim 1, where the instructions further cause the one or more processors to:
   for each of the one or more command queues for each of the one or more applications having a current utilization rate that has exceeded its respective normalized target utilization rate:
      designate the respective command queue as having an inactive status, wherein the designation of inactive status comprises not submitting work from the respective command queue to the graphics processor for execution for a frame the graphics processor is currently rendering.

8. The non-transitory program storage device of claim 7, wherein the instructions further cause the one or more processors to:
   in response to a determination that there are extra processing cycles remaining for a frame the graphics processor is currently rendering after completion of the submitted work from each command queue that has not exceed its respective normalized target utilization rate:
      submit work for at least one of the command queues designated as having an inactive status to the graphics processor for execution during the frame the graphics processor is currently rendering.

9. A system comprising:
   a memory; and
   a processor that interacts with the memory and includes a plurality of graphics hardware interfaces, wherein the processor is configured to:
      determine one or more applications executing concurrently on a first processor;
      determine one or more command queues for each of the one or more applications;
      generate a utilization table in the memory, wherein the utilization table stores a target utilization rate of a graphics processor for each of the one or more command queues for each of the one or more applications;
      normalize each of the target utilization rates in the utilization table, wherein the normalization is based on the number of applications executing concurrently on the first processor;
      obtain a current utilization rate of the graphics processor for each of the one or more command queues for each of the one or more applications; and
      for each of the one or more command queues for each of the one or more applications having a current utilization rate that has not exceeded its respective normalized target utilization rate:
         submit work from the respective command queue to the graphics processor for execution.

10. The system of claim 9, wherein each target utilization rate is based, at least in part, on a desired percentage usage of the graphics processor's available processing time for a given time interval.

11. The system of claim 9, wherein the processor is further configured to:
   provide each concurrently executing application an equal share of the graphics processor's resources.

12. The system of claim 9, wherein the current utilization rate of the graphics processor for a given command queue comprises: a utilization rate of the graphics processor on the given command queue for a frame the graphics processor is currently rendering.

13. The system of claim 9, wherein work from each of one or more command queues for each of the one or more applications targets one or more corresponding data masters of the graphics processor.

14. The system of claim 13, wherein each data master of the graphics processor comprises a programmable priority level, wherein the priority level is relative to the other data masters of the graphics processor.

15. The system of claim 9, wherein the processor is further configured to:
for each of the one or more command queues for each of the one or more applications having a current utilization rate that has exceeded its respective normalized target utilization rate:
designate the respective command queue as having an inactive status, wherein the designation of inactive status comprises not submitting work from the respective command queue to the graphics processor for execution for a frame the graphics processor is currently rendering.

16. The system of claim 15, wherein the processor is further configured to:
in response to a determination that there are extra processing cycles remaining for a frame the graphics processor is currently rendering after completion of the submitted work from each command queue that has not exceed its respective normalized target utilization rate:
submit work for at least one of the command queues designated as having an inactive status to the graphics processor for execution during the frame the graphics processor is currently rendering.

17. A computer-implemented method comprising:
determining one or more applications executing concurrently on a first processor;
determining one or more command queues for each of the one or more applications;
generating a utilization table, wherein the utilization table stores a target utilization rate of a graphics processor for each of the one or more command queues for each of the one or more applications;
normalizing each of the target utilization rates in the utilization table, wherein the normalization is based on the number of applications executing concurrently on the first processor;
obtaining a current utilization rate of the graphics processor for each of the one or more command queues for each of the one or more applications; and
for each of the one or more command queues for each of the one or more applications having a current utilization rate that has not exceeded its respective normalized target utilization rate:
submitting work from the respective command queue to the graphics processor for execution.

18. The computer-implemented method of claim 17, further comprising:
providing each concurrently executing application an equal share of the graphics processor's resources.

19. The computer-implemented method of claim 17, wherein the current utilization rate of the graphics processor for a given command queue comprises: a utilization rate of the graphics processor on the given command queue for a frame the graphics processor is currently rendering.

20. The computer-implemented method of claim 17, further comprising:
for each of the one or more command queues for each of the one or more applications having a current utilization rate that has exceeded its respective normalized target utilization rate:
designating the respective command queue as having an inactive status, wherein the designation of inactive status comprises not submitting work from the respective command queue to the graphics processor for execution for a frame the graphics processor is currently rendering.

\* \* \* \* \*